US012769742B2

(12) United States Patent
Leibundguth et al.

(10) Patent No.: US 12,769,742 B2
(45) Date of Patent: Oct. 20, 2026

(54) STRUCTURED QUERY LANGUAGE FOR IN-MEMORY DATASETS

(71) Applicant: NETFLIX, INC., Los Gatos, CA (US)

(72) Inventors: Jonathon Peter Leibundguth, Washington, DC (US); John Andrew Koszewnik, Morgan Hill, CA (US); Francisco Javier Sanchez Norman, Aguascalientes (MX)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/415,569

(22) Filed: Jan. 17, 2024

(65) Prior Publication Data

US 2025/0231945 A1 Jul. 17, 2025

(51) Int. Cl.
*G06F 16/2455* (2019.01)
*G06F 16/21* (2019.01)
*G06F 16/215* (2019.01)

(52) U.S. Cl.
CPC ...... *G06F 16/24556* (2019.01); *G06F 16/212* (2019.01); *G06F 16/215* (2019.01)

(58) Field of Classification Search
CPC . G06F 16/24556; G06F 16/212; G06F 16/215
USPC .......................................................... 707/693
See application file for complete search history.

(56) References Cited

U.S. PATENT DOCUMENTS 7,051,041 B1 5/2006 Miller
10,594,490 B2 3/2020 Hersans
10,990,318 B2 4/2021 Parker
11,163,792 B2 11/2021 Zhong et al.
2008/0294996 A1* 11/2008 Hunt ...................... G06Q 30/02 707/999.102
2009/0089334 A1 4/2009 Mohamed et al.
2010/0114908 A1 5/2010 Chand et al.
2010/0235313 A1 9/2010 Rea et al.
2012/0191732 A1 7/2012 George
2013/0297654 A1* 11/2013 Khimich ............. G06F 21/6227 707/783
2014/0074764 A1 3/2014 Duftler et al.
2014/0351233 A1* 11/2014 Crupi ................ G06F 16/24568 707/706
2015/0269193 A1 9/2015 King et al.
2018/0101312 A1* 4/2018 Koszewnik ............. G06F 3/065
(Continued)

OTHER PUBLICATIONS

[1] OracleÂ® Database Administrator's Guide 11g Release 2 (11.2) (Year: 2015).*
(Continued)

*Primary Examiner* — Kuen S Lu
(74) *Attorney, Agent, or Firm* — Artegis Law Group, LLP

(57) ABSTRACT

In various embodiments, a computer-implemented method comprises receiving a structured query identifying a plurality of source datasets, determining, based on a plurality of schemas associated with the plurality of source datasets, the plurality of source datasets associated with the structured query, loading a plurality of in-memory datasets, each in-memory dataset representing a source dataset in the plurality of source datasets, and executing the structured query on each of the plurality of in-memory datasets by causing portions of the structured query to be applied to each of the plurality of in-memory datasets to generate a query result.

20 Claims, 14 Drawing Sheets

(56) References Cited

U.S. PATENT DOCUMENTS

| | | | |
|---|---|---|---|
| 2018/0150466 | A1 | 5/2018 | Paquet et al. |
| 2019/0081876 | A1 | 3/2019 | Ghare et al. |
| 2019/0354559 | A1 | 11/2019 | Sabhanatarajan et al. |
| 2020/0151154 | A1 * | 5/2020 | Kumar .................. G06F 16/211 |
| 2020/0272348 | A1 | 8/2020 | Arnold et al. |
| 2020/0401598 | A1 | 12/2020 | Mehrotra et al. |
| 2021/0089535 | A1 * | 3/2021 | Chen ................. G06F 16/24542 |
| 2021/0109974 | A1 * | 4/2021 | Shekhar ................ G06F 3/0631 |
| 2022/0078149 | A1 * | 3/2022 | Hines .................. G06F 3/04842 |
| 2022/0171709 | A1 | 6/2022 | Trout |
| 2023/0078312 | A1 | 3/2023 | Meron et al. |
| 2023/0129099 | A1 | 4/2023 | Lee et al. |
| 2023/0147571 | A1 | 5/2023 | Singaram et al. |
| 2023/0259537 | A1 | 8/2023 | Vuskovic et al. |
| 2023/0350882 | A1 | 11/2023 | Cohen et al. |
| 2024/0070135 | A1 | 2/2024 | Ou et al. |
| 2024/0071374 | A1 | 2/2024 | Pisczak et al. |
| 2024/0119032 | A1 | 4/2024 | Liu |
| 2024/0144337 | A1 | 5/2024 | Fox et al. |
| 2024/0184793 | A1 * | 6/2024 | Amulu ................ G06F 16/2465 |

OTHER PUBLICATIONS

Oracle® Database Administrator's Guide 11g Release 2 (11.2) (Year: 2015).*

Database-in-memory-guide2022 (Year: 2022).*

Non Final Office Action received for U.S. Appl. No. 18/415,570 dated Oct. 21, 2024, 25 pages.

International Search Report for Application No. PCT/US2025/011932 dated Apr. 16, 2025.

International Search Report for Application No. PCT/US2025/011933 dated Apr. 16, 2025.

Nandi, Arnab, "Answering Imprecise Structured Search Queries", Jan. 1, 2011, 137 pages.

Benedikt et al., "PDQ 2.0: Flexible Infrastructure for Integrating Reasoning and Query Planning", SIGMOD Record, DOI: 10.1145/3582302.3582308, vol. 51, No. 4, Dec. 2022, pp. 36-41.

Notice of Allowance received for U.S. Appl. No. 18/415,570 dated Mar. 12, 2025, 13 pages.

Non Final Office Action received for U.S. Appl. No. 19/268,101 dated Jun. 11, 2026, 40 pages.

* cited by examiner

STRUCTURED QUERY LANGUAGE FOR IN-MEMORY DATASETS

BACKGROUND

Field of the Various Embodiments

Embodiments of the present invention relate generally to data processing and, more specifically, to techniques for generating and operating on in-memory datasets.

Description of the Related Art

In a video distribution system, there is often a source dataset that includes metadata describing various characteristics associated with the videos. Example datasets include a film dataset that stores characteristics of a given film, including title, genre, synopsis, cast, maturity rating, release date, run time, and the like. In operation, various applications executing on servers included in the system perform certain read-only memory operations on the dataset when providing services to end-users. For example, a content library application can perform correlation operations on records stored in the film dataset to recommend videos to an end-user. The same or another application (e.g., a video playback application) can perform various access operations on the dataset in order to retrieve and display information associated with a video to the end-user.

The source dataset used by applications in the video distribution system typically stores a large number of entries. For example, a source dataset can store both a list of television series and a linked list of episode titles. As another example, a different source dataset can contain a list of actors. Such source datasets include over 1 million records and are the size of multiple GB. At various times, users interact with a given source dataset by using tools to access information included within the source dataset. However, one drawback of conventional approaches is that such tools have difficulty processing or aggregating large volumes of records. For example, conventional tools enable access to individual records from an actor dataset to retrieve field values associated with a specific actor. However, such tools have difficulty filtering records based on specified criteria (e.g., retrieving a list of all actors born in the United Kingdom) or summarizing contents of the records (e.g., distribution of movie titles by content rating).

Some approaches address issues by using a query processor to provide an interface to the user and retrieve information from the contents of the source dataset. However, one drawback of such approaches is that conventional query processors require intense processing resources and perform such searches over lengthy time periods, usually multiple hours, before returning any results. To reduce the time required for a query processor to respond, devices oftentimes store a read-only copy of the source dataset in local random-access memory (RAM). However, conventional query processors also require considerable memory resources to fully scan or search the records of the in-memory dataset. As a result, devices storing the in-memory dataset and the query processor either limit the size of the in-memory datasets, such as by limiting the number of records or the complexity (e.g., primitive tables), or reducing the speed at which the contents of the in-memory dataset are scanned when generating a response to a query.

As the foregoing illustrates, what is needed in the art are more effective techniques for implementing datasets in computing environments.

SUMMARY

In various embodiments, a computer-implemented method comprises receiving a structured query identifying a plurality of source datasets, determining, based on a plurality of schemas associated with the plurality of source datasets, the plurality of source datasets associated with the structured query, loading a plurality of in-memory datasets, each in-memory dataset representing a source dataset in the plurality of source datasets, and executing the structured query on each of the plurality of in-memory datasets by causing portions of the structured query to be applied to each of the plurality of in-memory datasets to generate a query result.

In some embodiments, a computer-implemented method comprises receiving a structured query identifying a source dataset, determining that the structured query is associated with at least two versions of the source dataset, loading each of the at least two versions of the source dataset to memory as a first in-memory dataset and a second in-memory dataset in a plurality of in-memory datasets, and executing the structured query on at least the first in-memory dataset and the second in-memory dataset.

Additionally or alternatively, in some embodiments, a computer-implemented method comprises receiving a structured query for an in-memory dataset, identifying, based on the structured query, a plurality of tables included in the in-memory dataset, generating, for each table in the plurality of tables, a first index of records in the table that is associated with at least one field value responsive to the structured query, and a second index of records in the table that is not associated with at least one field value responsive to the structured query, and executing the structured query by processing indices in one or more of the tables to identify a list of records containing field values that are responsive to the structured query.

Other embodiments include, without limitation, a computer system that performs one or more aspects of the disclosed techniques, as well as one or more non-transitory computer-readable storage media including instructions for performing one or more aspects of the disclosed techniques.

At least one technical advantage of the disclosed technique relative to the prior art is that the in-memory dataset uses fewer memory resources than a corresponding source dataset. Consequently, the consumer device can access and search the contents of one or more datasets more efficiently and with greater precision than conventional systems. In particular, by using an in-memory query processor to build and subsequently process structured queries for the in-memory datasets, a consumer device can efficiently search multiple in-memory datasets, including multiple source datasets and multiple versions of a source dataset, without requiring major modifications to the source dataset. Further, by building indices of intermediate results to a structured query while scanning the records of an in-memory dataset, the in-memory query processor enables memoization of records included in large datasets, eliminating the query processor continually traversing through multiple levels of hierarchical tables when processing a given record. Such memoization thereby reduces the processing resources required to generate a response to a structured query. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
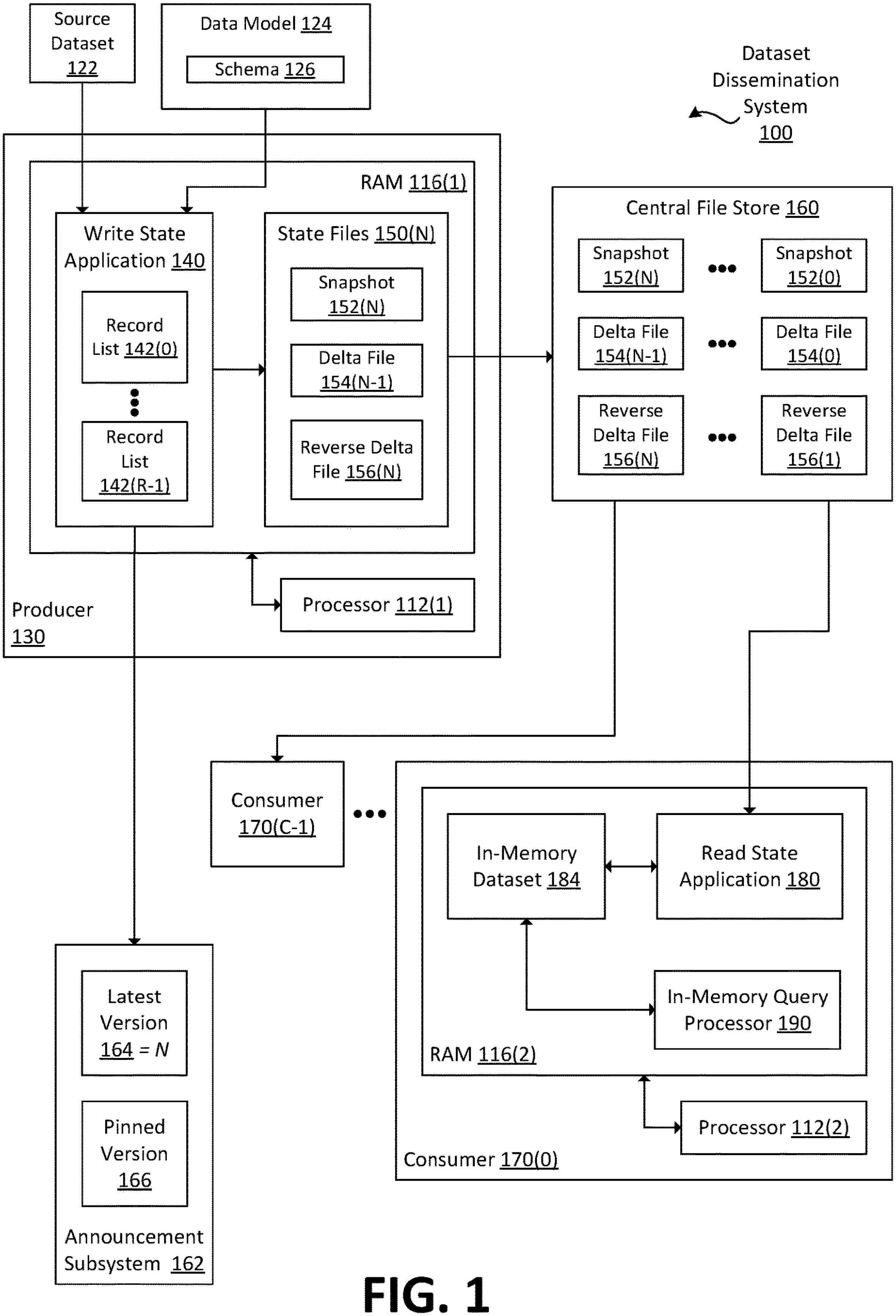
FIG. 1 is a conceptual illustration of a dataset dissemination system configured to implement one or more aspects of the present disclosure.

In the following description, numerous specific details are set forth to provide a more thorough understanding of the various embodiments. However, it will be apparent to one skilled in the art that the inventive concepts can be practiced without one or more of these specific details.

Overview

In a content distribution system, consumer devices regularly retrieve information associated with content, such as metadata associated with the content itself (e.g., film title, run time, etc.), or information associated with the content (e.g., rating, actors, director, genre, etc.). Various applications executing on devices within the system read contents of data sources to acquire the information for use in various applications, such as acquiring metadata for a specific content item, or using data values as inputs in a function, such as determining how many content items match a search performed by a user. Therefore, being able to scan data sources to acquire, filter, or aggregate information is an important factor in efficiently running various programs within the content distribution system. Prior art techniques for acquiring information from a data source (e.g., a source dataset in a remote server) used a query processor and a user interface to generate simple queries to acquire a specific record, such as information for a single film, or performed operations on information stored in primitive tables. However, many data sources store information in large datasets that include complex structures, such as linked lists, hierarchical references, and so forth. Thus, such prior art techniques do not adequately filter or summarize information from large and complex data sets.

With the disclosed techniques, however, a given device can interrogate the contents of multiple, complex datasets in a quick and efficient manner, enabling robust searching, filtering, and aggregation and enhancing the overall user experience associated with interacting with a large dataset. In various embodiments, an in-memory query processor executing on a consumer device provides an interface that enables a user to generate a structured query on data values stored in one or more source datasets. The interface retrieves schemas defining the content and structure of a dataset and provides field names, value types, and other metadata associated with the contents of records in a source dataset. The user generates a structured query specifying one or more datasets, operators, and additional criteria (e.g., specific field names, output types, etc.) for the in-memory query processor to adhere to when executing the query. The in-memory query processor identifies one or more applicable source datasets and causes the applicable source datasets to be loaded into the local memory of the consumer device as one or more in-memory datasets. The in-memory datasets can represent one or more source datasets, such as separate databases (e.g., a film database, an actor database, an internal expenses database, etc.). The in-memory datasets can also represent one or more versions of a specific dataset (e.g., a January 2020 dataset and an April 2020 dataset). The in-memory query processor executes the structured query using the in-memory datasets to generate a response.

When processing the structured query, the in-memory query processor executes one or more operators specified in the structured query to aggregate, filter, and/or deduplicate records included in the in-memory datasets. When at least one of the in-memory datasets includes a hierarchical set of linked tables, the in-memory query processor processes the contents of records in multiple levels of tables before determining whether a given record is responsive to the query. In such instances, the in-memory query processor generates a true index and a false index at each level in the hierarchy of tables where results included in the true index indicate that a record is responsive to the structured query.

The in-memory query processor traverses through the hierarchy of tables and determines a result for a record at the root, indexing the result in either the true index or false index at each table level. As the in-memory query processor continues to process records that link to records that have already been indexed, the in-memory query processor returns the indexed result in lieu of further processing linked records stored in the hierarchical set of tables. Upon completing execution of the structured query, the in-memory query processor provides a set of results that are responsive to the structured query.

Advantageously, a consumer device in a content distribution system that employs the disclosed in-memory query processor addresses various limitations of conventional content distribution systems that store source datasets remotely and slowly scan source datasets to produce results to a query. More specifically, conventional systems allow viewing of individual records within a source dataset, but have difficulty performing complex filtering or aggregation operations on large datasets, often requiring multiple hours to execute a query. As a result, conventional systems limit the types of searches or the structures of source datasets to limit the time necessary to execute a query.

By contrast, the consumer device that employs the in-memory query processor provides users with an interface to craft structured queries to interrogate the contents of in-memory datasets that are loaded into the memory of a consumer device. These structured queries enable users to filter and search datasets in a manner that reduces the lengthy search times associated with conventional searches of large datasets, which would require multiple hours to return a response. Consequently, the in-memory query processor enables users to search and summarize data included in large datasets, such as datasets including millions of records without changing the complexity of the datasets storing the records.

Dataset Dissemination System

FIG. 1 is a conceptual illustration of a dataset dissemination system 100 configured to implement one or more aspects of the present invention. As shown, the dataset dissemination system 100 includes, without limitation, a source dataset 122, a data model 124, a producer 130, a central file store 160, an announcement subsystem 162, and any number of consumers 170. The data model 124 includes, without limitation, one or more schemas 126. The producer 130 includes, without limitation, a processor 112(1), a RAM 116(1), a write state application 140 and one or more state files 150. The write state application 140 includes, without limitation, one or more record lists 142. The state files 150 includes, without limitation, a snapshot 152, a delta file 154, and a reverse delta file 156. The announcement subsystem 162 includes, without limitation, a latest version 164 and a pinned version 166. The consumer 170 includes, without limitation, a processor 112(2), a RAM 116(2), a read state application 180, one or more in-memory datasets 184, and an in-memory query processor 190.

For explanatory purposes, multiple instances of like objects are denoted with reference numbers identifying the object and parenthetical numbers identifying the instance where needed.

The processor 112 can be any instruction execution system, apparatus, or device capable of executing instructions. For example, the processor 112 can comprise a central processing unit (CPU), a graphics processing unit (GPU), a controller, a microcontroller, a state machine, or any combination thereof. The RAM 116 stores content, such as software applications and data, for use by the processor 112 of the compute instance. Each of the RAMs 116 can be implemented in any technically-feasible fashion and can differ from the other RAMs 116. For example, a capacity of the RAM 116(1) included in the producer 130 can be larger than a capacity of the RAM 116(2) included in the consumer 170(0).

In some embodiments, additional types of memory (not shown) can supplement the RAM 116. The additional types of memory can include additional RAMs, read-only memory (ROM), floppy disk, hard disk, or any other form of digital storage, local or remote. In the same or other embodiments, a storage (not shown) can supplement the RAM 116. The storage can include any number and type of external memories that are accessible to the processor 112. For example, and without limitation, the storage can include a Secure Digital Card, an external Flash memory, a portable compact disc read-only memory (CD-ROM), an optical storage device, a magnetic storage device, or any suitable combination of the foregoing.

In general, the producer 130 and each of the consumers 170 are configured to implement one or more applications and/or one or more subsystems of applications. For explanatory purposes only, each application and each subsystem is depicted as residing in the RAM 116 of a single compute instance and executing on a processor 112 of the single compute instance. However, as persons skilled in the art will recognize, the functionality of each application and subsystem can be distributed across any number of other applications and/or subsystems that reside in the memories of any number of compute instances and execute on the processors 112 of any number of compute instances in any combination. Further, the functionality of any number of applications and/or subsystems can be consolidated into a single application or subsystem.

In general, for each of the producers 130, the dataset dissemination system 100 enables one or more applications executing on the processor 112 to perform read-only operations on an in-memory representation of a dataset that is stored in the RAM to provide services to end-users. For example, in some embodiments, each of the producers 130 can correspond to a server executing in a video distribution system.

In a conventional video distribution system, there is a conventional dataset that includes metadata describing various characteristics of the videos. Example characteristics include title, genre, synopsis, cast, maturity rating, release date, and the like. In operation, various applications executing on servers included in the system perform certain read-only memory operations on the conventional dataset when providing services to end-users. For example, an application can perform correlation operations on the conventional dataset to recommend videos to end-users. The same or another application can perform various access operations on the conventional dataset in order to display information associated with a selected video to end-users.

To reduce the time required for applications to respond to requests from end-users, a server oftentimes stores a read-only copy of the conventional dataset in local RAM. One limitation of storing a conventional dataset in RAM is that, over time, the size of the conventional dataset typically increases. For example, if the video distributor begins to provide services in a new country, then the video distributor can add subtitles and country-specific trailer data to the conventional dataset. As the size of the conventional dataset increases, the amount of RAM required to store the conventional dataset increases and can even exceed the storage capacity of the RAM included in a given server. Further, because of bandwidth limitations, both the time required to initially copy the conventional dataset to the RAM and the time required to subsequently update the copy of the conventional dataset increase. To enable the size of a conventional dataset to grow beyond the storage capacity of the RAM included in a given server, the conventional dataset can be stored in a central location having higher capacity memory, and then the server can remotely access the conventional dataset. One drawback of this approach, however, is that the latencies associated with accessing the conventional dataset from the remote location can increase the time required for one or more applications to respond to end-user requests to unacceptable levels.

While the limitations above are described in conjunction with a video distribution system, similar limitations exist in many types of systems that implement conventional techniques to operate on read-only datasets. Together, a write state application 140 and a read state application 180 mitigate the limitations associated with conventional techniques for these types of system. As shown, the write state application 140 resides in the RAM 116(1) and executes on the processor 112(1) of the producer 130. In general, the write state application 140 sequentially executes any number of write cycles in response to any type of write cycle criterion. For example, the write cycle criterion can be an interval of time between write cycles. Prior to executing an initial write cycle, the write state application reads a data model 124.

The data model 124 defines a structure for the source data values included in a source dataset 122. In particular, the data model 124 includes, without limitation, any number of schemas 126. The schema 126 defines a structure for a strongly-typed collection of fields and/or references that is referred to herein as a "record." Each schema 126 defines the structure for a record of a different type. In some embodiments, a given schema 126 includes, without limitation, any amount and type of metadata that defines a structure of the records with a specific type of record. In some embodiments, the types of records include any number of object types associated with specific Plain Old Java Object (POJO) classes, any number of list types, any number of set types, and any number of map types. In some embodiments, a schema 126 defines any number of types, such as hierarchical types, any technically-feasible fashion.

The source dataset 122 represents any amount and type of source data values in any technically-feasible fashion. Over time, the source data values represented by the source dataset 122 can change. As referred to herein, a "state" corresponds to the source data values included in the source dataset 122 at a particular point in time. Each state is associated with a version. For example, an initial state is associated with a version of 0.

To initiate a write cycle associated with a current state N, the write state application 140 reads the source data values represented in the source dataset 122. The write state application 140 generates and/or updates one or more record lists 142 based on the schemas 126 and the source data values. Each of the record lists 142 includes a type and one or more records. For example, in some embodiments, a movie source dataset 122 includes metadata associated with movies, and the data model 124 includes a schema 126 that defines a structure for a record of a type "movie object" included in the source dataset 122. Based on the source dataset 122 and the data model 124, the write state application 140 generates the record list 142 that includes records representing movies.

Notably, as part of initially generating a particular record, the write state application 140 executes any number of compression operations on the corresponding source data values to generate compressed data. Some examples of compression operations include, without limitation, deduplication operations, encoding operations, packing operations, and overhead elimination operations. The compressed data for a particular record represents the source data values associated with the record in a fixed-length bit-aligned format that is amenable to individual access of the different source data values.

Figure 2:
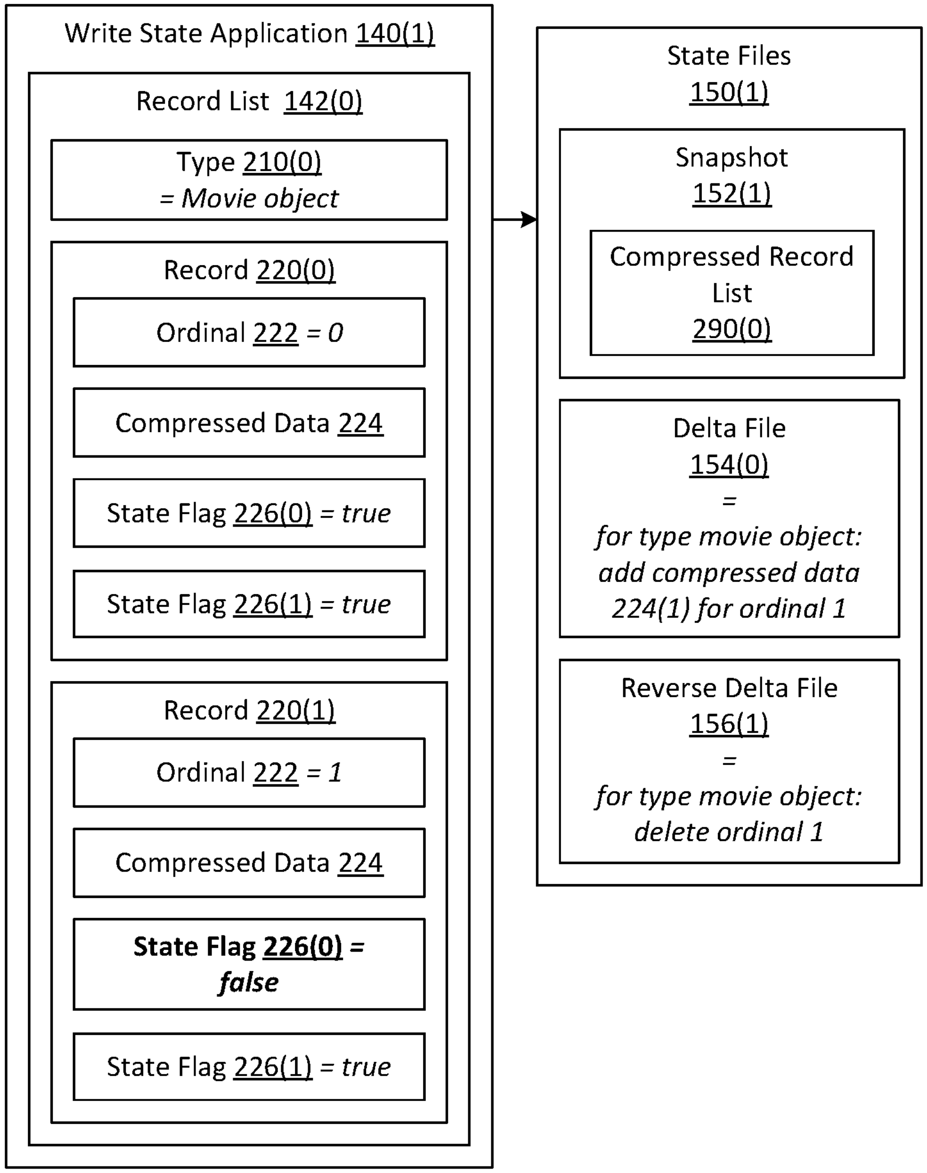
FIG. 2 illustrates state files that are generated by the write state application of FIG. 1, according to various embodiments of the present disclosure.

As described in greater detail in conjunction with FIG. 2, each record includes one or more state flags that indicate whether the record represents a previous state (N−1), the current state N, or both the previous state (N−1) and the current state N. In this fashion, each record enables the write state application 140 to track differences between states, such as differences between the previous state (N−1) and the current state N.

After generating the record lists 142, the write state application 140 generates state files 150(N) associated with the current state N. As shown, the state files 150(N) include, without limitation, a snapshot 152(N), a delta file 154(N−1), and a reverse delta file 156(N). The snapshot 152(N) represents the state associated with the current version N. The write state application 140 generates the snapshot 152(N) based on the compressed data included in the records that represent the current state N as indicated via the state flags.

The delta file 154(N−1) specifies a set of instructions to transition from an immediately preceding snapshot 152(N−1) to the snapshot 152(N). The write state application 140 generates the delta file 154(N−1) based on the records that are included in exactly one of the current snapshot 152(N) and the preceding snapshot 152(N−1) as indicated via the state flags. The reverse delta file 156(N) specifies a set of instructions to transition from the current snapshot 152(N) to the immediately preceding snapshot 152(N−1). The write state application 140 generates the reverse delta file 156(N) based on the records that are included in exactly one of the current snapshot 152(N) and the preceding snapshot 152(N−1) as indicated via the state flags. Notably, because there is no preceding state associated with the initial state, the state files 150(0) associated with the initial state include empty placeholders for the delta file 154 and the reverse delta file 156. In some embodiments, the state files 150(0) can be associated with the single snapshot 152(0) in any technically feasible fashion.

Subsequently, for all but the write cycle associated with the initial state, the write state application 140 performs validation operations on the state files 150(N). First, the write state application 140 applies the delta file 154(N−1) to the snapshot 152(N−1) to generate a forward snapshot. The write state application 140 then applies the reverse delta file 154(N) to the snapshot 152(N) to generate a reverse snapshot. If the forward snapshot matches the snapshot 152(N) and the reverse snapshot matches the snapshot 152(N−1), then the write state application 140 determines that the state files 150(N) are valid. By contrast, if the forward snapshot differs from the snapshot 152(N) or the reverse snapshot differs from the snapshot 152(N−1), then the write state application 140 determines that the state files 150(N) are invalid.

If the state files 150(N) are invalid, then the write state application 140 issues an error message and terminates the current write cycle. The next write cycle is associated with the version N. If, however, the state files 150(N) are valid, then the write state application 140 copies the state files 150(N) to the central file store 160. The central file store 160 can be implemented in any technically feasible fashion. Further, the central file store 160 can be configured to include any number of the snapshots 152, the delta files 154, and the reverse delta files 156 in any combination.

The write state application 140 announces that the state files 150(N) are available via the announcement subsystem 162. More specifically, the write state application 140 sets a memory location included in the announcement subsystem 162 that stores a latest version 164 equal to the current version N. In some embodiments, the write state application 140 announces that the state files 150(N) are available in any technically-feasible fashion. Subsequently, the write state application 140 increments the current state and executes a new write cycle.

As shown, a different copy of the read state application 180 resides in the RAM 116(2) and executes on the processor 112(2) of each of the consumers 170. In general, the read state application 180 sequentially executes any number of read cycles in response to any type of read cycle criterion. Examples of read cycle criterion include detecting a change to the latest version 164, detecting a change to a pinned version 166, and a time interval between read cycles, to name a few. The read state application 180 includes, without limitation, a stored version (not shown). The stored version specifies the version of a snapshot 152 stored in the RAM 116(2) as an in-memory dataset 184. Prior to an initial cycle, the read state application 180 sets the stored version to a value indicating that the read state application 180 has not yet stored any of the snapshots 152 in the RAM 116(2).

To initiate a read cycle, the read state application 180 determines an optimal version based on the announcement subsystem 162. First, the read state application 180 determines whether the announcement subsystem 162 specifies a pinned version 166. The pinned version 166 can be specified in any technically-feasible fashion by any entity to indicate that consumers 170 should transition to a snapshot 152(M), where M is less than or equal to the pinned version 166. The pinned version 166 can reflect an error that is associated with the snapshots 152 corresponding to versions following the pinned version 166.

If the announcement subsystem 162 specifies the pinned version 166, then the read state application 180 sets the optimal version equal to the pinned version 166. If, however, the announcement subsystem 162 does not specify the pinned version 166, then the read state application 180 sets the optimal version equal to the latest version 164.

The read state application 180 interacts with the announcement subsystem 162 in any technically-feasible fashion. For example, the read state application 180 performs a read operation on two different memory locations included in the announcement subsystem 162 that store, respectively, the pinned version 166 and the latest version 164. In another example, the read state application 180 can subscribe to a notification service provided by the announcement subsystem 162. The announcement subsystem 162 then notifies the read state application 180 whenever the pinned version 166 or the latest version 164 changes.

The read state application 180 determines a next version based on the optimal version and the state files 150 stored in the central file store 160. The read state application 180 determines one or more "available" versions for which the required state files 150 are stored in the central file store 160. Subsequently, the read state application 180 selects the available versions that do not exceed the optimal version. Then, the read state application 180 sets the next version equal to the highest selected version. If the stored version is equal to the next version, then the read state application 180 terminates the read cycle. If, however, the stored version is not equal to the next version, then the read state application 180 generates a plan to transition the in-memory dataset 184 from the stored version to the next version. If the stored version is less than the next version, then the plan includes one of the snapshots 152 and/or one or more delta files 154. If the stored version is greater than the next version, then the plan includes one of the snapshots 152 and/or one or more of the reverse delta files 156

If one of the snapshots 152 is included in the plan, then the read state application 180 selects the snapshot 152 specified in the plan. The read state application 180 copies the selected snapshot 152 from the central file store 160 to the random access memory (RAM) 116(2) to generate the in-memory dataset 184. The read state application 180 then sets the stored version equal to the version associated with the selected snapshot 152. Subsequently, the read state application 180 determines whether the stored version is less than the next version. If the stored version is less than the next version, then for each of the delta files 154 included in the plan, the read state application 180 sequentially applies the delta file 154 to the in-memory dataset 184. If the stored version is not less than or equal to the next version, then for each of the reverse delta files 154 included in the plan, the read state application 180 sequentially applies the reverse delta file 154 to the in-memory dataset 184.

In various embodiments, the read state application 180 sets the stored version equal to the next version. Advantageous, the read state application 180 can perform any number of operations with the in-memory dataset 184 while retaining a size of the in-memory dataset 184. For example, the read state application 180 can perform an unaligned read operation on the in-memory dataset 184. Further, the amounts of bandwidth consumed to initialize and update the in-memory dataset 184 are decreased relative to the amounts of bandwidth typically experienced with prior art solutions to storing local copies of datastores in the RAM 116.

The in-memory query processor 190 executes structured queries associated with one or more in-memory datasets 184 representing one or more source datasets 122. In some embodiments, the in-memory query processor 190 accesses records within the in-memory datasets 184 and determines whether a given record is responsive to the structured query. As will be discussed in further detail with FIGS. 3-10, the in-memory query processor 190 can execute structured queries 310 that are associated with multiple source datasets 122 and/or multiple versions of a source dataset 122. Additionally or alternatively, the in-memory query processor 190 can execute queries on complex in-memory datasets 184 that include hierarchical sets of tables by memorizing results in real time to reduce repetitive comparisons of field values and speed the execution of a structured query.

Note that the techniques described herein are illustrative rather than restrictive, and can be altered without departing from the broader spirit and scope of the invention. Many modifications and variations on the functionality provided by the dataset dissemination system 100, the write state application 140, the read state application 180, the announcement subsystem 162, and the central file store 160 will be apparent to those of ordinary skill in the art without departing from the scope and spirit of the described embodiments. For instance, in various embodiments, any number of the techniques or devices can be implemented while other techniques can be omitted or replaced in any technically feasible fashion.

In various embodiments, the dataset dissemination system 100 can provide additional functionality to perform a variety of tasks related to managing the in-memory datasets 184. In some embodiments, the write state application 140 can generate an application specific interface (API) based on the data model 124 to facilitate performing read-only operations on source data values represented in the in-memory dataset 184. Methods included in the API can or can not be agnostic with respect to the semantics of the data model 124. Methods that are agnostic with respect to the semantics of the data model 124 enable applications to apply generic operations across the in-memory dataset 184. Examples of generic methods include methods that perform scan operations, query operations, indexing operations, and grouping operations, and so forth.

In the same or other embodiments, a toolset application can include functionality to perform filtering, splitting, and/or patching. Filtering refers to omitting certain data source values from the in-memory dataset 184 when storing the in-memory dataset 184 in the RAM 116(2). Splitting refers to sharding a dataset into multiple datasets. Patching refers to manufacturing one or more additional delta files 154 between two adjacent snapshots 152. In some embodiments, a metrics optimization application can optimize for performance metrics, such as metrics that measure garbage collection activities. For example, the metrics optimization application can pool and reuse memory in the heap to avoid allocation for the objects/arrays responsible for holding the actual data. Since these particular objects will be retained for a relatively long period of time (the duration of a cycle) they can live long enough to get promoted to tenured space in a generational garbage collector. Promoting non-permanent objects to tenured space will result in many more major and/or full garbage collections which will adversely affect the performance of the processors 112.

FIG. 2 illustrates state files 150(1) that are generated by the write state application 140 of FIG. 1, according to various embodiments of the present disclosure. For explanatory purposes only, the source dataset 122 includes source data values corresponding to instances of a single type 210(0) of movie object. In some embodiments, the source dataset 122 can include source data values corresponding to any number of instances of any number of types 210, in any combination.

In some embodiments, the write state application 140 generates the state file 150 when the source dataset 122 is in an initial state corresponding to a version of 0. In the initial state, the source dataset 122 includes source data values corresponding to a single instance of the data type 210(0). Accordingly, as shown, the write state application 140(0) generates the record list 142(0) that includes, without limitation, the type 210(0) of "movie object" and the record 220(0) representing the single instance. In general, the write state application 140(0) generates each of the records 220 included in a particular record list 142(*i*) to represent source data values corresponding to a different instance of the type 210 associated with the record list 142(*i*).

The record 220(0) initially includes, without limitation, an ordinal 222, compressed data 224, and a state flag 226(0). The ordinal 222 is a number that uniquely identifies a particular record 220 with respect to the other records 220 included in the record list 142. In some embodiments, the compressed data 224 includes, without limitation, a compressed, fixed-length, bit-aligned representation of the source data values corresponding to the instance represented by the record 220(0). The state flag 226(0) specifies whether the record 220(0) represents source data values that are included in the source dataset 122 associated with the initial state. As a general matter, for a particular record 220, the state flag 226(*x*) specifies whether the record 220 represents source data values that are included in the source dataset 122 associated with the state x. In this fashion, the source flags 226(*x*) facilitate the identification and tracking of differences between various states.

After generating the record lists 142 that represent the source dataset 122 when the source dataset 122 is in the initial state of 0, the write state application 140(0) generates the snapshot 152 that represents the initial state of the source dataset 122. For the initial state, the snapshot 152 comprises the snapshot 152 corresponding to the initial state of the source dataset 122. The snapshot 152 includes a compressed record list 290. The write state application 140 generates the compressed record list 290 based on the record list 142.

In general, to generate the snapshot 152(*i*), for each of the record lists 142, the write state application 140 selects the records 220 for which the state flag 226(*i*) is equal to true. For each of the record lists 142, the write state application 140 serializes the compressed data 224 included in the selected records 220 sequentially based on an increasing order of the ordinals 222 to generate an associated record bit array (not shown in FIG. 2). For each of the record lists 142, the write state application 140 then generates a compressed record list 290 based on the associated record bit array. The compressed record list 290 comprises a fixed-length and bit-aligned sequence of bits. Finally, the write state application 140 serializes the compressed record lists 290 to generate the snapshot 152(*i*).

In various embodiments, the write state application 140(1) generates the state files 150(1) when the source dataset 122 is in an subsequent state 1 corresponding to a version of 1. In the state 1, the source dataset 122 includes source data values corresponding to two instances of the data type 210(0). More specifically, the source dataset 122 includes source data values representing the single instance of the type 210(0) that was also included in the initial set of the source dataset 122 as well as source data values representing a new instance of the type 210(0).

First, the write state application 140(1) generates the new record 220(1) to represent the source data values corresponding to the new instance of the type 210(0). As shown, the new record 220(1) includes the ordinal 222 of 1, the compressed data 224 representing the new source values, the state flag 226(0) of false, and the state flag 226(1) of true. The state flag 226(0) specifies that the record 220(0) represents source data values that are not included in the source dataset 122 associated with the state 0. By contrast, the state flag 226(1) specifies that the record 220(1) represents source data values that are included in the source dataset 122 associated with the state 1.

Subsequently, the write state application 140(1) updates each of the previously-existing records 220 to include a state flag 226(1) that specifies whether the record 220 specifies source data is included in the current state (i.e., 1). As shown, the write state application 140(1) sets the state flag 226(1) included in the record 220(0) to true to indicate that the record 220(0) represents source data values that are included in the source dataset 122 associated with the state 1.

After updating the record lists 142 to represent the source dataset 122 when the source dataset 122 is in the state of 1, the write state application 140 generates the snapshot 152(1) that represents the state 1 of the source dataset 122. As described in conjunction with FIG. 2A, the write state application 140 generates the snapshot 152(1) based on the state flags 226(1). As a result, the compressed record list 290(0) included in the snapshot 152(1) represents both instances of the type 210(0) of movie objects.

The write state application 140 also generates the delta file 154(0) that specifies instructions to transition from the state 150(0) to the state 150(1) and the reverse delta file 154(1) that species instructions to transition from the state 150(1) to the state 150(0). More specifically, as shown, the delta file 150(0) includes an instruction to add the compressed data 224(1) to the compressed record list 290(0) corresponding to the record list 142(0) of type 210(0) based on the ordinal 222 of 1. By contrast, the reverse delta file 150(1) includes an instruction to delete the compressed data 224(1) included in the compressed record list 290(0) corresponding to the record list 142(0) of type 210(0) located at the ordinal 222 of 1. Together, the snapshot 152(1), the delta file 154(0), and the reverse delta file 156(1) comprise the state files 150(1).

Structured Queries for In-Memory Datasets

Figure 3:
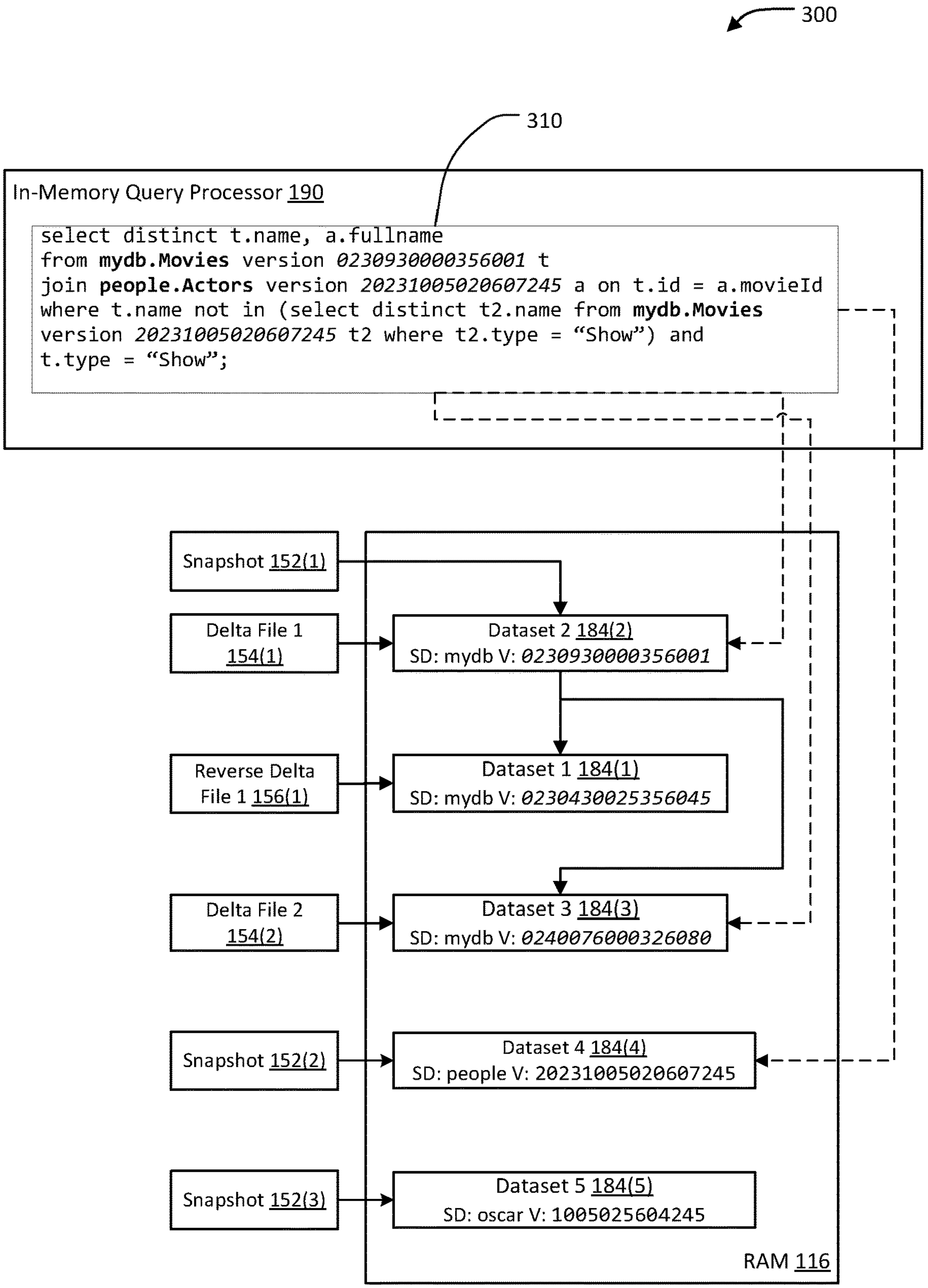
FIG. 3 illustrates the in-memory query processor of FIG. 1 executing a search on multiple in-memory datasets, according to various embodiments of the present disclosure.

FIG. 3 illustrates the in-memory query processor 190 of FIG. 1 executing a search on multiple in-memory datasets 184, according to various embodiments of the present disclosure. As shown, the consumer device 300 includes, without limitation, the in-memory query processor 190, the RAM 116, the snapshot 152(1), the delta file 154(1), and the reverse delta file 156(1). The in-memory query processor 190 includes, without limitation, a structured query 310. The RAM 116(2) includes, without limitation, in-memory datasets 184(1)-184(5).

In operation, the in-memory query processor 190 parses the structured query 310. The in-memory processor 190 processes the parsed syntax of the structured query 310 and identifies a plurality of source datasets 122 that are to be queried. The source datasets 122 include a 'people' source dataset 122(1) and a 'mydb' source dataset 122(2). Upon identifying the source datasets 122(1)-122(2) applicable to the structured query 310, the in-memory query processor 190 checks the contents of the RAM 116(2) to determine whether in-memory datasets 184 representing each of the respective identified source dataset 122(1)-122(2) and each of the respective identified versions of the source datasets 122(1)-122(2) are loaded. When the in-memory query processor 190 identifies that the RAM 116(2) does not include a representation of a source dataset 122, the in-memory query processor 190 provides a command to the read state application 180 to generate a representation of the applicable source dataset 122 and load the representation into the RAM 116. The read state application 180 responds by retrieving a snapshot 152 corresponding to a version of the source dataset 122 and applying one or more delta files 154 and/or reverse delta files 156 to generate a representation of a specific version of the applicable source dataset 122. The read state application 180 loads the generated representation into the RAM 116(2) as an in-memory dataset 184 (e.g., the in-memory dataset 184(1)).

The structured query 310 is a domain-specific query to access, filter, and interrogate data held in a structured database. The structured query 310 is a statement containing a statement and additional parameters and operands that apply to the statement. In various embodiments, the in-memory query processor 190 generates structured queries 310 that are valid for searching one or more domains corresponding to one or more in-memory datasets 184. Additionally or alternatively, in some embodiments, the consumer device 170(0) and/or a remote device stores one or more saved structured queries 310. In such instances, the in-memory query processor 190 receives a command to load a saved structure query 310 and retrieves the specified saved structure query 310 from a data store. As will be discussed in further detail with FIG. 4, the in-memory query processor 190 can retrieve one or more schemas 126 from one or more data models 124 associated with a given source dataset 122 and/or a corresponding in-memory dataset 184. In such instances, the in-memory query processor 190 can refer to the contents of the schemas 126 to validate the structured query 310 before executing the query on representations of the identified source datasets 122.

In various embodiments, the structured query 310 identifies two or more source datasets 122 (e.g., a source dataset 122(1) and a source dataset 122(2)). The in-memory query processor 190 executes the structured query 310 by retrieving data from records 220 included in two or more in-memory datasets 184 representing the two or more identified source datasets 122. For example, the structured query 310 includes a JOIN operator that combines the 'people' source dataset 122(1) and the 'mydb' source dataset 122(2). Additionally or alternatively, the structured query 310 can specify two or more versions of a given source dataset 122. For example, the structured query 310 includes a DISTINCT operator that selects records from version 2 (e.g., version 0230930000356001) of the 'mydb' source dataset 122(2) that are not present in version 1 (e.g., version 20231005020607245) of the 'mydb' source dataset 122(2).

Additionally or alternatively, the structured query 310 includes one or more operators that modify how the in-memory query processor 190 retrieves or manipulates data retrieved from the records 220 included in the in-memory datasets 184. For example, the structured query 310 can include one or more aggregating operators (e.g., operations such as SUM, COUNT, AVERAGE, MIN, MAX, etc.), one or more filtering operators (e.g., SELECT, DISTINCT, etc.), one or more classifying operators, and so forth. The in-memory query processor 190 executes the structured query 310 by scanning the records 220 and/or tables of the in-memory datasets 184(1)-184(5) and identifying records 220 that are responsive to the query. In such instances, the in-memory query processor 190 executes the structured query 310 by compiling a list of records 220 that are responsive to the structured query 310 and provides the response to a user via the consumer device 170(0).

In various embodiments, the in-memory query processor 190 parses the structured query 310 to identify the source datasets 122 applicable to the query. Upon identifying the applicable source datasets 122, the in-memory query processor 190 determines whether the RAM 116(2) includes an in-memory dataset 184 representing each source dataset 122 identified in the structured query 310. When the in-memory query processor 190 determines that each identified dataset has a corresponding in-memory dataset 184 loaded into the RAM 116, the in-memory query processor 190 executes portions of the structured query 310 on the in-memory datasets 184 as specified in the structured query 310.

In some embodiments, the in-memory query processor 190 determines that at least one identified source dataset 122 does not have a corresponding in-memory dataset 184 loaded into the RAM 116. In such instances, the in-memory query processor 190 sends a command for the read state application 180 to generate and load a representation of the source dataset 122 into the RAM 116. In various embodiments, the read state application 180 loads an in-memory dataset 184 representing the source dataset 122 by copying a snapshot 152 corresponding to the source dataset 122 into the RAM 116. For example, the read state application 180 can copy snapshots 152(1)-152(3), respectively, from local storage of the consumer device 170(0) and generate in-memory datasets 184(1)-184(5), where in-memory datasets 184(1)-184(3) represent different versions of the 'mydb' source dataset 122(2), the in-memory dataset 4 184(4) represents the 'people' source dataset 122(1), and the in-memory dataset 5 184(5) represents the 'oscar' source dataset 122(3).

In some embodiments, the read state application 180 applies one or more delta files 154 and/or one or more reverse delta files to load a specific version of the source dataset 122 into the RAM 116. For example, the read state application 180 retrieves the snapshot 152(1) from local storage and applies the delta file 1 154(1) to generate the in-memory datasets 2 184(2) and applies the delta file 2 154(2) to the in-memory dataset 2 184(2) to generate the in-memory dataset 3 184(1). Additionally or alternatively, the read state application 180 applies the reverse delta file 1 156(1) to the in-memory dataset 2 184(2) to produce the in-memory dataset 1 184(1). The in-memory datasets 184 (1)-184(3) represent different versions of the 'mydb' source dataset 122(2). In such instances, the in-memory query processor 190 can execute one or more structured queries 310 over multiple versions of the 'mydb' source dataset 122(2) two or more of the in-memory datasets 184(1)-184 (3).

Figure 4:
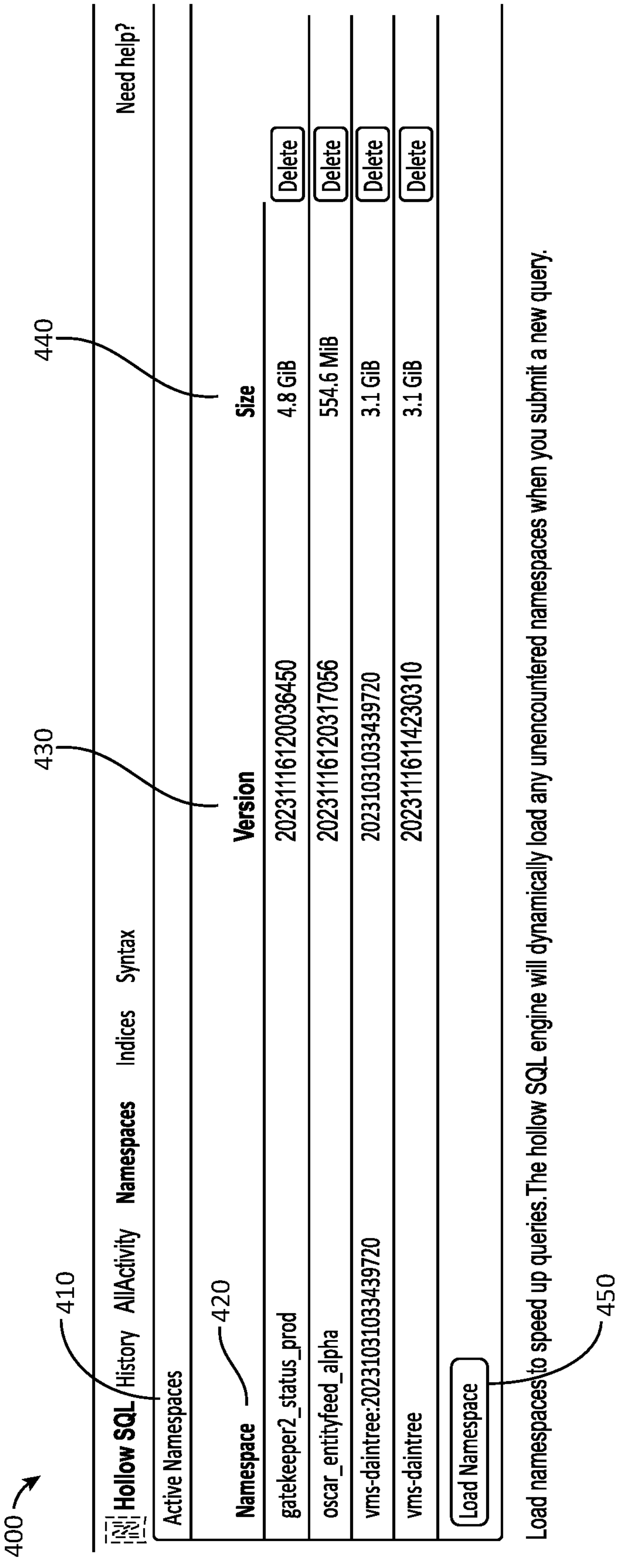
FIG. 4 illustrates an example interface for selecting in-memory datasets provided by the in-memory query processor of FIG. 1, according to various embodiments of the present disclosure.

FIG. 4 illustrates an example dataset interface 400 for selecting source datasets provided by the consumer device of FIG. 1, according to various embodiments of the present disclosure. As shown, the dataset interface 400 includes, without limitation, an active namespace window 410, a namespace column 420, a version column 430, a size column 440, and a load namespace icon 450.

In operation, read state application 180 determines one or more source datasets 122 ("namespaces") that are stored locally or available remotely. A user selects the load namespace icon 450 and selects one or more source datasets 122 to load into memory. The read state application 180 receives the user input and responds by loading into the RAM 116(2) one or more in-memory datasets 184 representing the selected source datasets 122. The read state application 180 acquires information about each in-memory dataset 184 and lists the information in one or more columns 420-440 within the namespace window 410.

In various embodiments, the read state application 180 provides the dataset interface 400 before the in-memory query processor 190 provides an interface for generating a structured query 310. In such instances, the read state application 180 loads the in-memory datasets 184 that are to be available for access by the in-memory query processor 190. Additionally or alternatively, the read state application 180 and/or the in-memory query processor 190 acquires one or more schemas 126 included in data models 124 that correspond to the source datasets 122 represented by the available in-memory datasets 184.

Figure 5:
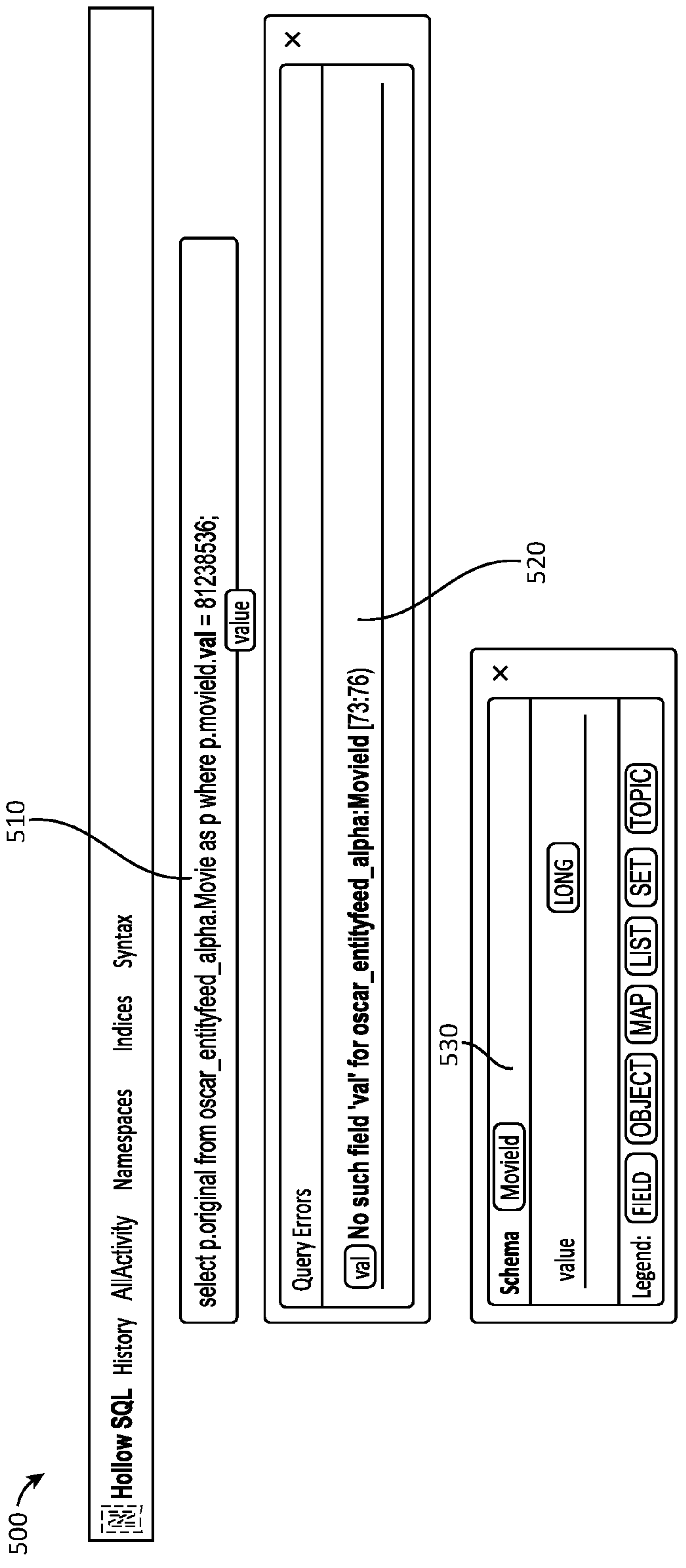
FIG. 5 illustrates an example interface for generating a structured query provided by the in-memory query processor of FIG. 1, according to various embodiments of the present disclosure.

FIG. 5 illustrates an example query interface 500 for generating a structured query provided by the in-memory query processor of FIG. 1, according to various embodiments of the present disclosure. As shown, the query interface 500 includes, without limitation, a query window 510, a validation window 520, and a contextual window 530.

In operation, a user inputs portions of a structured query 310 into the query window 510. The in-memory query processor 190 validates the portions of the structured query 310. When the in-memory query processor 190 determines that a portion of the structured query 310 is not valid, the in-memory query processor 190 highlights the invalidated portion of the structured query 310 and provides contextual information about the validation error within the validation window 520. In some embodiments, the in-memory query processor 190 also provides contextual information about parameters defined by the one or more schema 126 associated with the in-memory datasets 184.

In various embodiments, the in-memory query processor 190 validates the structured query 310 by comparing portions of the structured query 310 with contents of the schema 126 and/or libraries containing valid operators. For example, upon identifying the in-memory dataset 4 184(4) in the RAM 116, the in-memory query processor 190 retrieves one or more schemas 126 associated with the 'people' source database 122(2). The in-memory query processor 190 parses the structured query 310 and refers to the contents of the schemas 126 to determine whether the structured query 310 properly recites parameters defined by at least one of the schemas 126. When the in-query processor 190 is unable to find a match for a particular portion, the in-memory query processor 190 updates the query window 510 by highlighting the invalidated portion and providing a drop-down of similar parameters that one or more of the schemas 126 validly define.

The contextual window 530 provides context-sensitive information about the one or more schemas 126 that define the structures of records stored within the in-memory datasets 184. For example, the in-memory query processor 190 can update the contextual window 530 with information from a schema 126 defining a table ('MovieId") included within the 'mydb' source dataset 122(2). The information includes metadata describing fields, objects, maps, lists, sets, topics, types, and so forth. The contextual information provided enables users to input valid structured queries 310 based on the schemas 126 defining the structures of records 220 included in the in-memory datasets 184.

Figure 6:
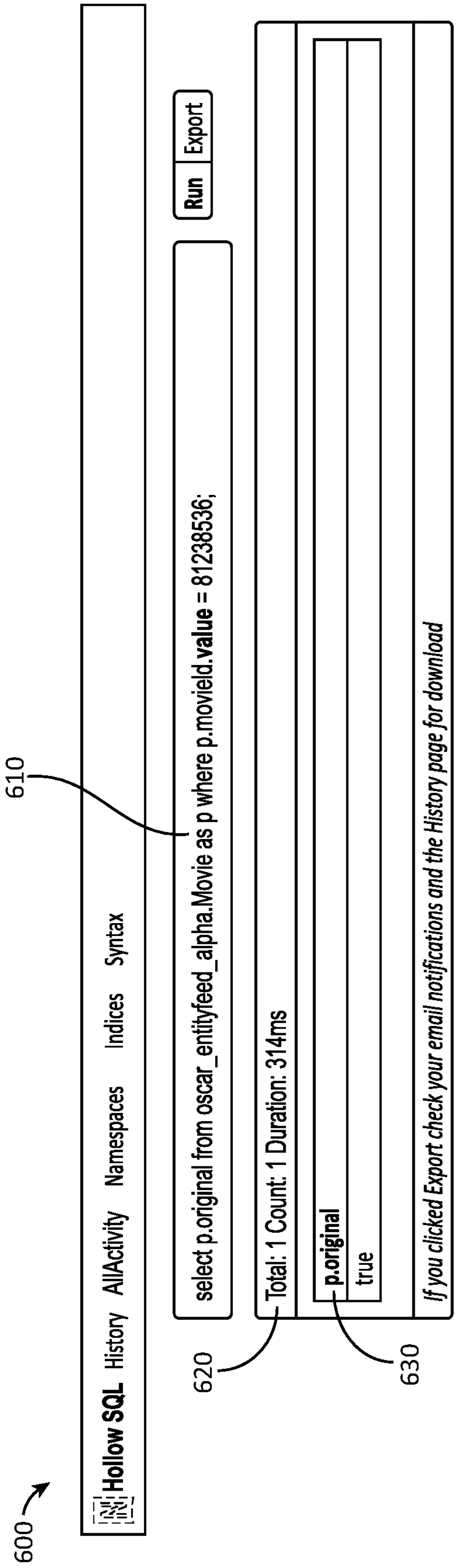
FIG. 6 illustrates an example interface displaying query results provided by the in-memory query processor of FIG. 1, according to various embodiments of the present disclosure.

FIG. 6 illustrates an example results interface 600 displaying query results provided by the in-memory query processor of FIG. 1, according to various embodiments of the present disclosure. As shown, the results interface 600 includes, without limitation, a query window 610, a statistics window, 620, and a results window 630.

In operation, the in-memory query processor 190 executes the structured query 310 and generates results. The in-memory query processor 190 displays the results via the interface in the results window 630. In some embodiments, the in-memory query processor 190 displays in the statistics window 620 statistics associated with the results and execution of the query. For example, the in-memory query processor 190 displays the total number of records responsive to the structured query 310, the number of results currently displayed, and the duration of the in-memory query processor 190 executing the query.

Figure 7:
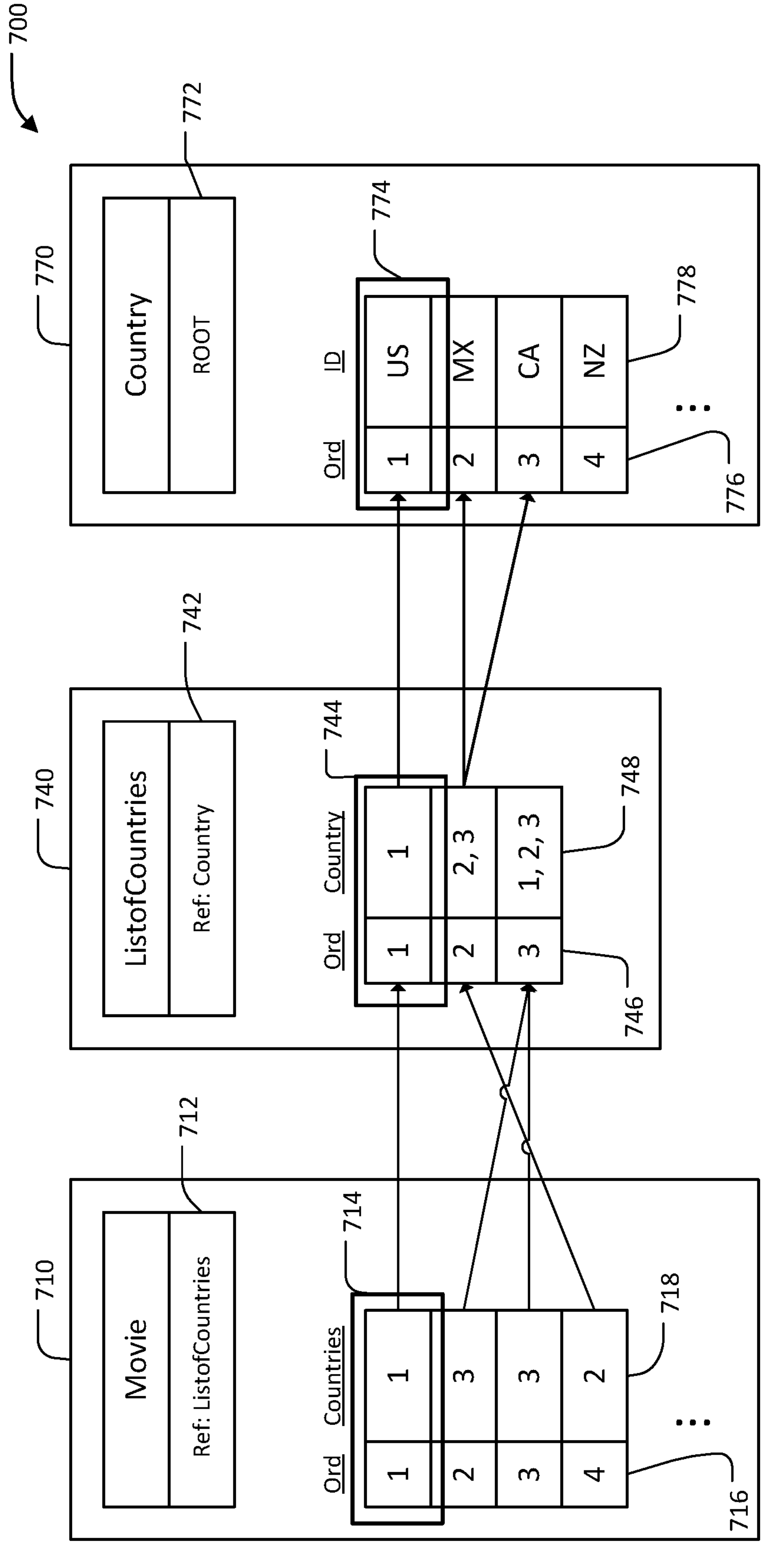
FIG. 7 illustrates a technique of the in-memory query processor of FIG. 1 indexing in real-time a list of related readstates, according to various embodiments of the present disclosure.

FIG. 7 illustrates a hierarchy of tables 700 traversed by the in-memory query processor 190 of FIG. 1, according to various embodiments of the present disclosure. As shown, the hierarchy of tables 700 includes, without limitation, a first level table 710, a second level table 740, and a third level table 770. The first level table ("movie") 710 includes a reference pointer 712, a set of records 714 (e.g., 714(1), 714(2), etc.), a set of ordinal values 716 (e.g., 716(1), 716(2), etc.), and a set of field values 718 (e.g., 718(1), 718(2), etc.). The second level table ("ListofCountries") 740 includes a reference pointer 742, a set of records 744, a set of ordinal values 746, and a set of field values 748. The third level table ("Country") 740 includes a root indicator 772, a set of records 774, a set of ordinal values 776, and a set of field values 778.

In operation, the in-memory query processor 190 processes a record 714 by determining the field value 718. When the field value 718 is a reference to a different record 744 in a different level list, the in-memory query processor 190 uses the reference pointer 712 to identify the applicable table and uses the field value 718 to identify the applicable record 744. The in-memory query processor 190 also evaluates the field value 748 of the identified record 744 within the applicable table 740. In various embodiments, the in-memory query processor 190 traverses through multiple levels of linked tables until determining that a record 774 is a root and does not contain a reference to another record. Upon identifying a root record 744, the in-memory query processor 190 accesses the field value 778 included in the root record 774. The in-memory query processor 190 evaluates the field value 778 by comparing the field value 778 with an expression in the structured query 310 to determine whether the field value 778 satisfies the structured query 310. Based on the evaluation, the in-memory query processor 190 generates a result for inclusion in a readstate corresponding to the table 770.

For example, the structured query 310 can include a portion stating, "t.countries[*].id='US'", where the portion is a predicate for accessing records including a field value matching the string 'US'. The in-memory query processor 190 processes the first record 714(1), first traversing to record 744(1), then to 774(1) and determining that the field value 778 of US matches the 'US' specified in the structured query 310. In another example, the in-memory query processor 190 processes the record 714(4) by traversing to the record 744(2) included in the table 740. As the field values 748(2) include a list of records 774(2), 774(3), the in-memory query processor 190 evaluates each the records 774(2), 774(3) to determine whether either record 774(2), 774(3) is responsive to the predicate. Upon determining that neither of the records 774(2), 774(3) is responsive to the predicate, the in-memory query processor 190 determines that each of records 714(4), 744(2), 774(2), 772(3) is unresponsive to the predicate.

Figure 8:
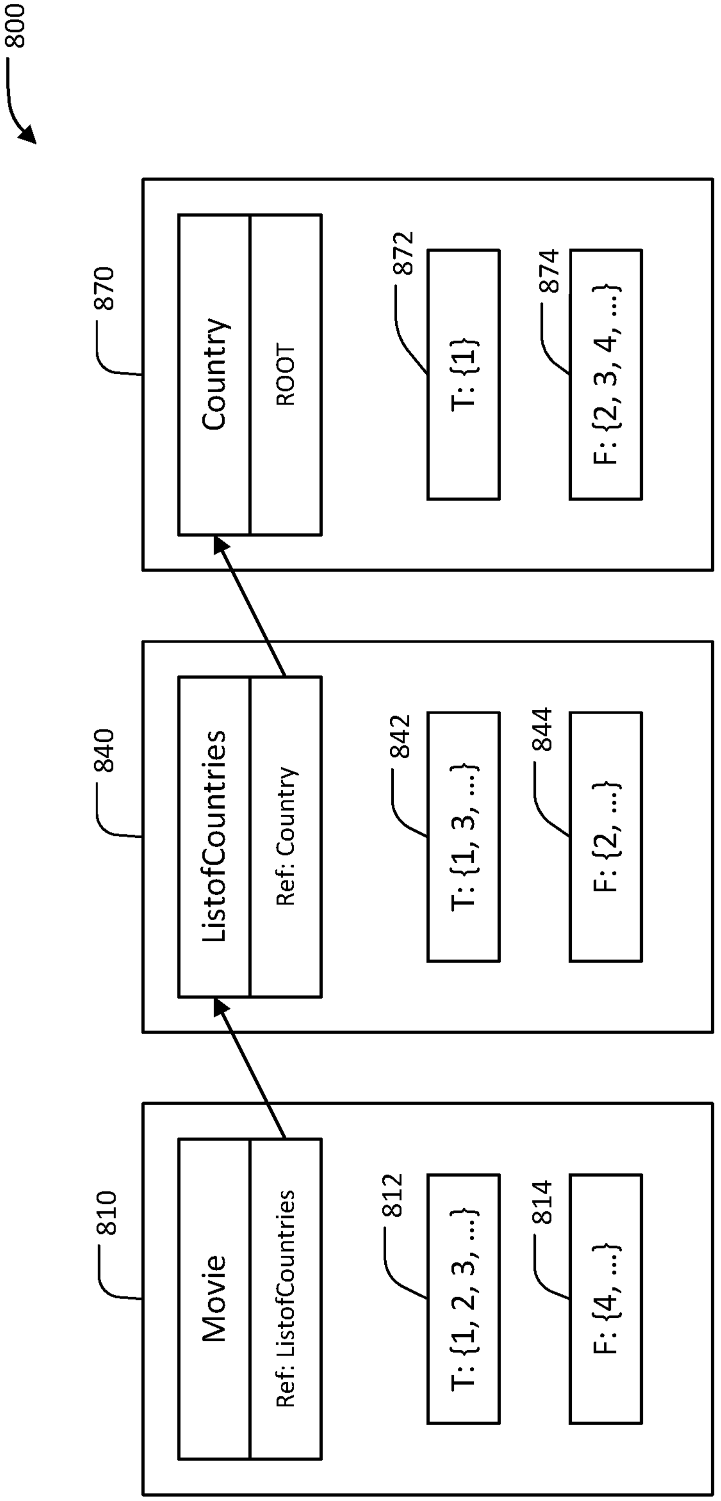
FIG. 8 illustrates a set of hierarchical indexes of tables generated by the in-memory query processor of FIG. 1 that are responsive to a structured query; according to various embodiments of the present disclosure.

FIG. 8 illustrates a set of indexes included in a hierarchical set of readstates 800 generated by the in-memory query processor 190 of FIG. 1, according to various embodiments of the present disclosure. The hierarchical set of readstates 800 includes, without limitation, a first-level readstate 810, a second-level readstate 840, and a third-level readstate 870. The first-level readstate 810 includes, without limitation, a true index 812 and a false index 814. The second-level readstate 840 includes, without limitation, a true index 842 and a false index 844. The third-level readstate 870 includes, without limitation, a true index 872 and a false index 874.

In operation, the in-memory query processor 190 performs memoization of the results in real-time of evaluating records by including the results for a given record in one of the indices for a readstate. For example, upon traversing from the record 714 to the root record 774, the in-memory query processor 190 evaluates the 'ID' parameter value 748 for the record 774 and determines the value is responsive to the structured query 310. The in-memory query processor 190 responds to the evaluation by classifying the ordinal value 746 ("1") for the record 774 into the true index 872 for the readstate 870. In some embodiments, upon adding the ordinal value 746 to the true index 872, the in-memory query processor 190 classifies the ordinals for the records 714, 744 referencing the record 774 based on the determined result. For example, upon classifying the ordinal value 746 into the true index 872, the in-memory query processor 190 similarly classifies the ordinal values 716, 746 for the records 714, 744 into the true indices 812, 842.

In various embodiments, the in-memory query processor 190 generates a hierarchical set of readstates 800 including readstates 810, 840, 870 that correspond to the respective linked tables 710, 740, 770 of the hierarchical set of tables 700. The readstates 810, 840, 870 maintain the same hierarchy as the linked tables 710, 740, 770 and store the results determined by the in-memory query processor 190. In some embodiments, a given readstate stores a set of bitsets that indicate whether a corresponding record is responsive to the structured query 310. For example, the bitset includes an ordinal for uniquely identifying a record and a Boolean value indicating whether the record is responsive or unresponsive to the query. In such instances, the in-memory query processor 190 can refer to the bitset in the readstate to determine whether the corresponding record is responsive to the structured query 310.

Additionally or alternatively, in some embodiments, the in-memory query processor 190 generates, for each readstate 810, 840, 870, a set of indices (e.g., indices 812 and 814, indices 842 and 844, indices 872 and 874, etc.). For example, a given readstate (e.g., the readstate 810) includes a true index 812 that includes ordinal values 716 for records that are responsive to the structured query 310 and a false index 814 that includes ordinal values 716 for records that are unresponsive to the structured query 310. In some embodiments, the indices 812, 814 persist until the in-memory query processor 190 executes the structured query; in such instances, the in-memory query processor 190 deletes the indices 812, 814 upon providing the result. Alternatively, in some embodiments, the in-memory query processor 190 persists the indices 812, 814 for later use, such as for saved searches or a repeated execution of one or more subsequent structured queries 310.

In various embodiments, the in-memory query processor 190 generates a list of results that are responsive to the structured query 310. The in-memory query processor 190 refers to the true index 812 of the highest-level readstate 810 to determine the ordinal values 716 that are responsive to the structured query 310. In such instances, the in-memory query processor 190 uses the ordinal values 716 to compile a list of records 714 that are responsive to the structured query 310.

Figure 9:
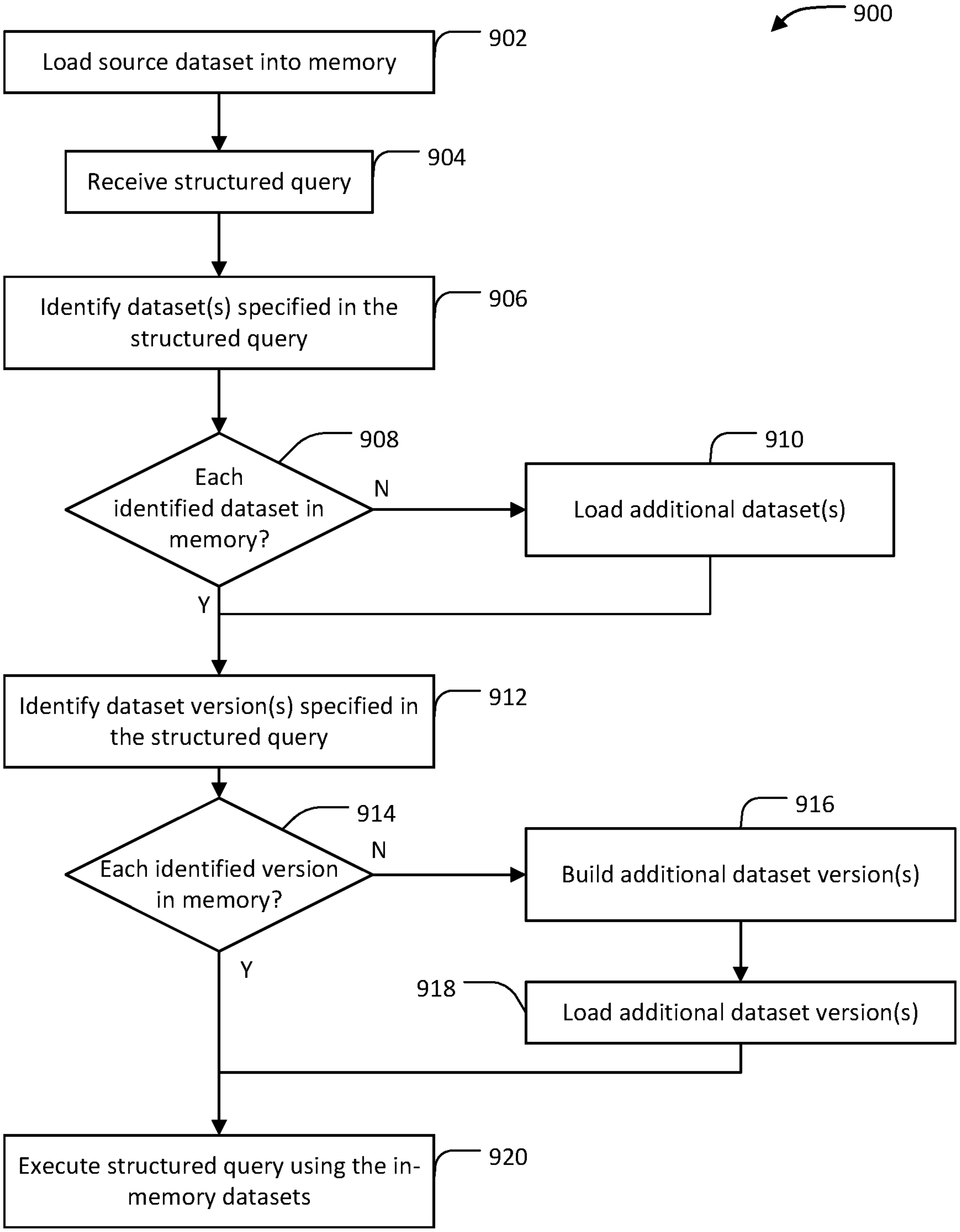
FIG. 9 sets forth a flow diagram of method steps for executing a structured query on one or more in-memory datasets, according to various embodiments of the present disclosure.

FIG. 9 sets forth a flow diagram of method steps for executing a structured query on one or more in-memory datasets, according to various embodiments of the present disclosure. Although the method steps are described with reference to the systems and call flows of FIGS. 1-8, persons skilled in the art will understand that any system configured to implement the method steps, in any order, falls within the scope of the present disclosure.

Method 900 begins at step 902, where the consumer device 170 loads a source dataset 122 into memory. In various embodiments, the read state application 180 executing on the consumer device 170 (e.g., the consumer device 170(0)) loads a representation of the source dataset 122 into the RAM 116(2) local to the consumer device 170. In various embodiments, the read state application 180 loads an in-memory dataset 184 representing the source dataset 122 by copying a snapshot 152 corresponding to the source dataset 122 into the RAM 116. In some embodiments, the read state application 180 applies one or more delta files 154 and/or one or more reverse delta files to load a specific version of the source dataset 122 into the RAM 116. In some embodiments, the read state application 180 or the in-memory query processor 190 provides an interface 400 listing available source datasets 122. In such instances, the read state application 180 or the in-memory query processor 190 receives an input indicating the source datasets 122 that are to be loaded into the RAM 116.

At step 904, the consumer device 170(0) receives a structured query 310. In various embodiments, the in-memory query processor 190 executing on the consumer device 170(0) receives a structured query 310 associated with one or more source datasets 122. In some embodiments, the in-memory query processor 190 provides a query interface 500 for a user to input contents of a structured query 310. In such instances, the in-memory query processor 190 receives one or more inputs via the query interface 500 and generates a structured query 310. Additionally or alternatively, in some embodiments, the consumer device 170(0) and/or a remote device stores one or more saved structured queries 310. In such instances, the in-memory query processor 190 receives a command to load a saved structure query 310 and retrieves the specified saved structure query 310 from a data store.

At step 906, the consumer device 170(0) identifies one or more source datasets 122 specified in the structured query 310. In various embodiments, the in-memory query processor 190 parses the structured query 310 to identify one or more source datasets 122 specified by the structured query 310. For example, the structured query 310 can include a JOIN operator that combines a query over two or more source datasets 122. In such instances, the structured query 310 identifies each source dataset 122 included in the structured query 310. Additionally or alternatively, the structured query 310 can specify two or more versions of a given source dataset 122. In such instances, the in-memory query processor 190 identifies each version of a given source dataset 122 included in the structured query 310.

At step 908, the consumer device 170(0) determines whether each of the identified datasets are loaded into memory. In various embodiments, the in-memory query processor 190 determines whether the RAM 116(2) includes an in-memory dataset 184 representing each source dataset 122 identified in the structured query 310. When the in-memory query processor 190 determines that each identified dataset has a corresponding in-memory dataset 184 loaded into the RAM 116, the in-memory query processor 190 proceeds to step 912. Otherwise, the in-memory query processor 190 determines that at least one identified dataset does not have a corresponding in-memory dataset 184 loaded into the RAM 116(2) and proceeds to step 910.

At step 910, the consumer device 170(0) loads one or more additional datasets. In various embodiments, the in-memory query processor 190 loads one or more in-memory datasets 184 representing each source dataset 122 specified in the structured query 310 that is not yet loaded into the RAM 116. In some embodiments, for each source dataset 122 identified in the structured query 310, the in-memory query processor 190 causes the read state application 180 to load a representation into the RAM 116. For example, the structured query 310 can include a JOIN operator for a ‘mydb’ source dataset, a ‘people’ source dataset, and an ‘oscar’ source dataset. Upon the in-memory query processor 190 determining that the RAM 116(2) does not include representations for the ‘people’ and ‘oscar’ source datasets, the in-memory query processor 190 causes the read state application to load representations for the ‘people’ and ‘oscar’ source datasets as in-memory datasets 184(4)-184(5).

At step 912, the consumer device 170(0) identifies each version of a source dataset 122 identified in the structured query 310. In various embodiments, the in-memory query processor 190 parses the structured query 310 to identify each version of a given source dataset 122 specified in the structured query 310. For example, the structured query can include a DISTINCT operator that selects records 220 from version 2 of a source dataset 122 that are not present in version 1 of the source dataset 122. In such instances, the in-memory query processor 190 responds by performing one or more of steps 914-918 to cause representations for each identified version of source dataset 122 to be loaded into the RAM 116.

At step 914, the consumer device 170(0) determines whether each version of the source dataset 122 identified in the structured query 310 has a representation loaded into memory. In various embodiments, the in-memory query processor 190 checks the RAM 116(2) to determine whether each version of each respective source dataset 122 identified in step 912 has a representative in-memory dataset 184 loaded into the RAM 116. When the in-memory query processor 190 determines that each identified version of the respective source dataset 122 has a representative in-memory dataset 184 loaded into the RAM 116, the consumer device 170(0) proceeds to step 920. Otherwise, the in-memory query processor 190 determines that each version of the respective source datasets 122 do not have a representative in-memory dataset 184 loaded into the RAM 116(2) and proceeds to step 916.

At step 916, the consumer device 170(0) builds the additional versions of the source dataset 122 that are not yet loaded into memory. In various embodiments, the in-memory query processor 190 causes the read state application 180 to build the additional versions of a source dataset 122 that do not have a representation loaded in the RAM 116. In some embodiments, the read state application 180 builds a given version of a source dataset 122 by copying a snapshot 152 corresponding to the source dataset 122 into the RAM 116. In some embodiments, the read state application 180 builds the given version of the source dataset 122 by applying one or more delta files 154 and/or one or more reverse delta files 156 to the snapshot 152. For example, the snapshot 152 can represent a version 2 of the source dataset 122. The read state application 180 can generate version 1 of the source dataset by applying the reverse delta file 156 and can generate version 3 of the source dataset 122 by applying the delta file 154 to the snapshot 152.

At step 918, the consumer device 170(0) loads the additional versions of the source dataset 122 into memory. In various embodiments, the read state application 180 loads the generated representations of the versions of the respective source dataset 122 into the RAM 116. For example, upon generating versions 1-3 of a source dataset 122, the read state application 180 can load the respective representations into the RAM as in-memory datasets 184(1)-184(3).

At step 920, the consumer device 170(0) executes the structured query 310 using the in-memory datasets 184. In various embodiments, the in-memory query processor 190 executes the structured query 310 by performing each of the specified operations on one or more of the in-memory datasets 184(1)-184(5). For example, the structured query 310 can include one or more aggregating operators (e.g., operations such as SUM, COUNT, AVERAGE, MIN, MAX, etc.), one or more filtering operators (e.g., SELECT, DISTINCT, etc.), one or more classifying operators, and so forth. The in-memory query processor 190 executes the structured query 310 by scanning the records 220 and/or tables of the in-memory datasets 184(1)-184(5) and identifying records 220 that are responsive to the query. In such instances, the in-memory query processor 190 executes the structured query 310 by compiling a list of records 220 that are responsive to the structured query 310 and provides the response to a user via the consumer device 170(0).

Figure 10:
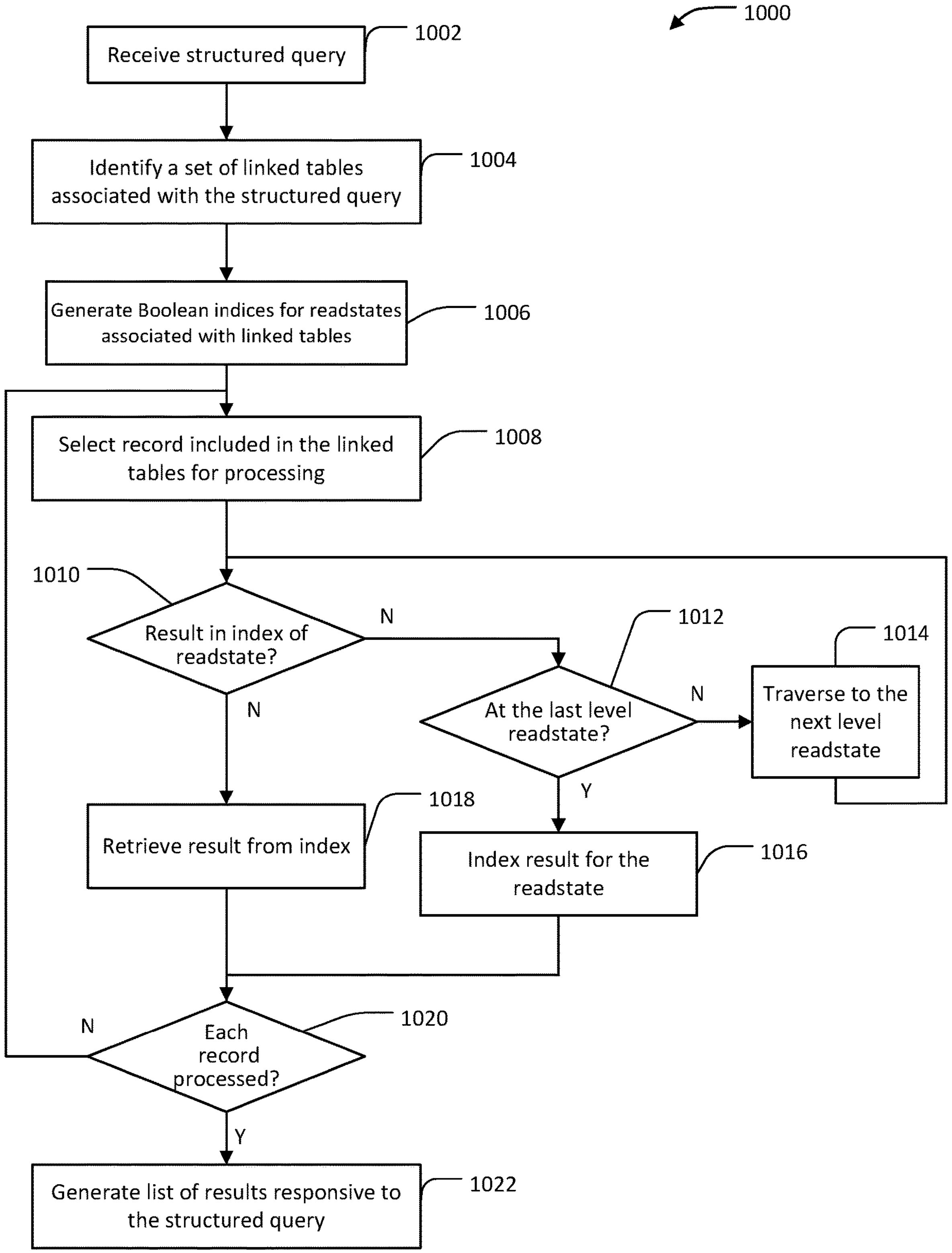
FIG. 10 sets forth a flow diagram of method steps for indexing and searching a set of related tables, according to various embodiments of the present disclosure.

FIG. 10 sets forth a flow diagram of method steps for indexing and searching a set of related tables, according to various embodiments of the present disclosure. Although the method steps are described with reference to the systems and call flows of FIGS. 1-8, persons skilled in the art will understand that any system configured to implement the method steps, in any order, falls within the scope of the present disclosure.

Method 1000 begins at step 1002, where the in-memory query processor 190 receives a structured query 310. In various embodiments, the in-memory query processor 190 executing on the consumer device 170(0) receives a structured query 310 associated with one or more source datasets 122. In some embodiments, the in-memory query processor 190 provides a query interface 500 for a user to input the contents for a structured query 310. In such instances, the in-memory query processor 190 receives one or more inputs via the query interface 500 and generates a structured query 310. Additionally or alternatively, in some embodiments, the consumer device 170(0) and/or a remote device stores one or more saved structured queries 310. In such instances, the in-memory query processor 190 receives a command to load a saved structure query 310 and retrieves the specified saved structure query 310 from a data store.

At step 1004, the in-memory query processor 190 identifies one or more linked tables 710, 740, 770 that are associated with the structured query 310. In various embodiments, the in-memory query processor 190 executes one or more operators specified in the structured query 310 to aggregate, filter, and/or deduplicate records 220 included in the in-memory datasets. For example, the structured query can include various types of predicates that require processing the contents of multiple records. Such predicates include, for example, an equality predicate (e.g., table.column=<value>), various Boolean predicates (e.g., AND, OR, NOT, etc.), and/or other types of predicates (e.g., IN, LIKE, BETWEEN, EXISTS, etc.) that determine whether various records are responsive to the structured query 310. In such instances, the in-memory query processor 190 separately processes the multiple predicates and determines whether a particular predicate that determine a response based on comparisons of contents within multiple tables. For example, at least one of the in-memory datasets 184 includes a hierarchical set of tables 710, 740, 770, where processing of a single record 714 (e.g., 714(1)) with respect to an applicable predicate requires the in-memory query processor 190 processing contents of multiple records 744, 774 included in a hierarchical set of tables 700. In such instances, the in-memory query processor 190 determines each table 710, 740, 770 included in the hierarchical set of tables within an in-memory dataset 184.

At step 1006, the in-memory query processor 190 generates Boolean indices for readstates associated with the one or more linked tables 710, 740, 770. In various embodiments, upon identifying each linked table 710, 740, 770, the in-memory query processor 190 generates readstates 810, 840, 870 that correspond to the respective linked tables 710, 740, 770. The readstates maintain the same hierarchy as the linked tables 710, 740, 770 and store the results determined by the in-memory query processor 190. In various embodiments, the in-memory query processor 190 generates, for each readstate 810, 840, 870, a set of indices (e.g., indices 812 and 814, indices 842 and 844, indices 872 and 874, etc.). A given readstate (e.g., the readstate 810) includes a true index 812 including results that are responsive to the structured query 310 and a false index 814 including results that are unresponsive to the structured query 310.

At step 1008, the in-memory query processor 190 processes records included in the linked tables 710, 740, 770. In various embodiments, the in-memory query processor 190 selects a record 714 for evaluation. The in-memory query processor 190 evaluates whether a record 714 is responsive to the parameters and/or operators included in the structured query 310. For example, the in-memory query processor 190 can perform a compare operation between a string included in a field value 718 of a record 714 and an expression in the structured query 310 to determine whether the string matches the expression. In various embodiments, the in-memory dataset 184 includes a large quantity of records. For example, the 'movie' table 710 can include over 1 million records. In such instances, the in-memory query processor 190 can iteratively process each record in the 'movie' table 710 when generating a list of records that are responsive to the structured query 310.

At step 1010, the in-memory query processor 190 determines whether a result for the record 714 is included in an index for the readstate 810. In various embodiments, the in-memory query processor 190 determines whether a result for a record is currently included in an index of the table. In various embodiments, the in-memory query processor 190 performs evaluations of records by traversing through linked records within the hierarchical set of tables 700 to identify a root record (e.g., the record 774) and evaluate whether the root record 774 is responsive to the structured query 310. The in-memory query processor 190 generates a bitset for the result, where the bitset includes the ordinal uniquely identifying the record 774 within the linked table 770 and a Boolean value indicating whether the record is responsive or unresponsive to the query. Based on the Boolean value, the in-memory query processor 190 adds the ordinal of the bitset into either the true index or the false index, populating the indices at each level based on the determined results. When the in-memory query processor 190 evaluates the record 714 selected in step 1008, the in-memory query processor 190 determines whether the ordinal value 716 for the record 714 is already included in one of the indices 812, 814. When the in-memory query processor 190 identifies the ordinal value 716 in one of the indices 812, 814, the in-memory query processor 190 proceeds to step 1018. Otherwise, the in-memory query processor 190 does not identify the ordinal value 716 in one of the indices 812, 814 and proceeds to step 1012.

At step 1012, the in-memory query processor 190 determines whether the in-memory query processor 190 is currently at the last level readstate. In various embodiments, the in-memory query processor 190 determines whether the readstate the in-memory query processor 190 is interrogating is the root of a hierarchical set of readstates 810, 840, 870. When the in-memory query processor 190 determines that the in-memory query processor 190 is not currently at the last level readstate, the in-memory query processor 190 proceeds to step 1014 to traverse to the next level readstate (e.g., traverse from the readstate 810 to the readstate 840) before returning to step 1010 to interrogate the applicable record in within the readstate 840. Otherwise, the in-memory query processor 190 determines that the in-memory query processor 190 is not currently at the last level readstate and proceeds to step 1016.

At step 1016, the in-memory query processor 190 indexes the result for the readstate. In various embodiments, when the in-memory query processor 190 processes the records in the linked tables 710, 740, 770, the in-memory query processor 190 performs memoization of the results in real-time by including the results for a given record in one of the indices for the readstate. For example, upon determining that the ID parameter value 748 for the record 774 is responsive to the structured query 310, the in-memory query processor 190 classifies the ordinal value 746 ("1") for the record 774 into the true index 872 for the country readstate 870. In some embodiments, upon adding the ordinal value 746 to the true index 872, the in-memory query processor 190 classifies the ordinals for the records 714, 744 referencing the record 774 based on the determined result. For example, upon classifying the ordinal value 746 into the true index 872, the in-memory query processor 190 similarly classifies the ordinal values 716, 746 for the records 714, 744 into the true indices 812, 842.

At step 1018, the in-memory query processor 190 retrieves a readstate from an index. In various embodiments, upon identifying the applicable ordinal value 716 for the record 714 within one of the indices 812, 814, the in-memory query processor 190 retrieves the result for the record 714. In some embodiments, the in-memory query processor 190 references the index containing the ordinal value 716 to retrieve the result. For example, the in-memory query processor 190 can identify the ordinal value 716 for the record 714 within the true index 812. In such instances, the in-memory query processor 190 determines that the result for record 714 is true and determines that the record 714 is responsive to the structured query 310.

At step 1020, the in-memory query processor 190 determines whether each readstate has been processed. In various embodiments, the in-memory query processor 190 iteratively processes each record 714 (e.g., 714(1), 714(2), etc.) included in linked table 710. When the in-memory query processor 190 determines that each record 714 has been processed, the in-memory query processor 190 proceeds to step 1020. Otherwise, the in-memory query processor 190 that at least one record needs processing and returns to step 1008 to select another record 714.

At step 1022, the in-memory query processor 190 generates a list of results that are responsive to the structured query. In various embodiments, the in-memory query processor 190 refers to the true index 812 of the highest-level readstate 810 to determine the ordinal values 716 that are responsive to the structured query 310. In such instances, the in-memory query processor 190 uses the ordinal values to compile a list of records 714 that are responsive to the structured query 310. In some embodiments, the in-memory query processor 190 applies other operators to aggregate, filter, and/or modify the list of results. For example, the in-memory query processor 190 can perform a DISTINCT operation by deduplicating records that are common to lists of results. In various embodiments, the in-memory query processor 190 displays the list of results via the results interface 600.

Content Distribution System Overview

Figure 11:
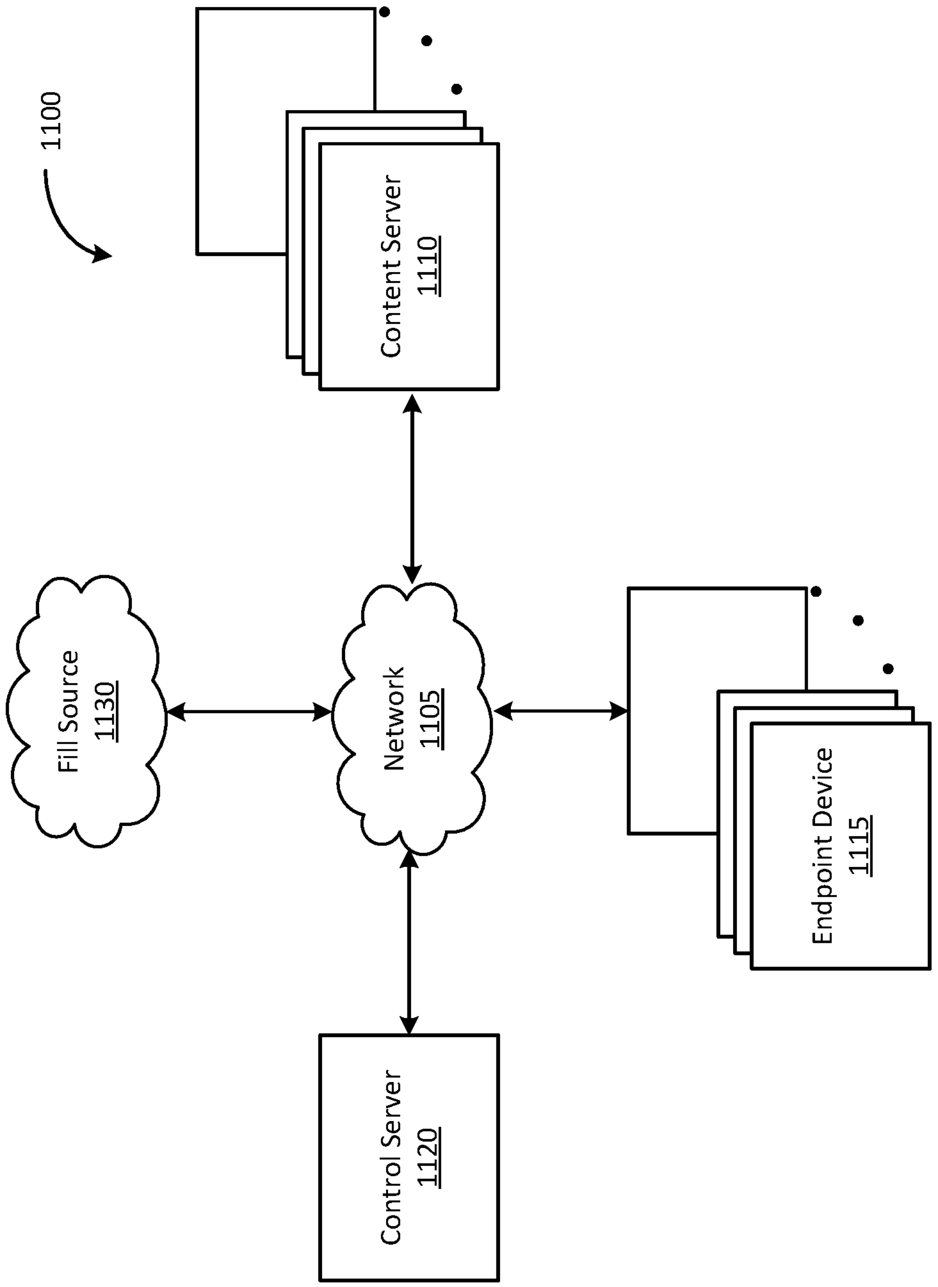
FIG. 11 illustrates an example network infrastructure, according to various embodiments of the present disclosure.

FIG. 11 illustrates an example network infrastructure, according to various embodiments of the present disclosure. As shown, the network infrastructure 1100 includes one or more content servers 1110, a control server 1120, and one or more endpoint devices 1115, which are connected to one another and/or one or more cloud services 1130 via a communications network 1105. The network infrastructure 1100 is generally used to distribute content to the content servers 1110 and the endpoint devices 1115.

Each endpoint device 1115 (e.g., 1115(1), 1115(2), etc.) communicates with one or more content servers 1110 (also referred to as "caches" or "nodes") via the network 1105 to download content, such as textual data, graphical data, audio data, video data, and other types of data. The downloadable content, also referred to herein as a "file," is then presented to a user of the one or more endpoint devices 1115. In various embodiments, the endpoint devices 1115 can include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically-feasible computing platform that has network connectivity and is capable of presenting content, such as text, images, video, and/or audio content, to a user.

The network 1105 includes any technically-feasible wired, optical, wireless, or hybrid network that transmits data between or among content servers 1110, control server 1120, endpoint device 1115, cloud services 1130, and/or other components. For example, the network 1105 can include a wide area network (WAN), local area network (LAN), personal area network (PAN), WiFi network, cellular network, Ethernet network, Bluetooth network, universal serial bus (USB) network, satellite network, and/or the Internet.

Each content server 1110 can include one or more applications configured to communicate with the control server 1120 to determine the location and availability of various files that are tracked and managed by the control server 1120. Each content server 1110 can further communicate with the cloud services 1130 and the one or more other content servers 1110 to "fill" each content server 1110 with copies of various files. In addition, the content servers 1110 can respond to requests for files received from the endpoint devices 1115. The files can then be distributed from the content server 1110 or via a broader content distribution network. In some embodiments, the content servers 1110 can require users to authenticate (e.g., using a username and password) before accessing files stored on the content servers 1110. Although only a single control server 1120 is shown in FIG. 1, in various embodiments, multiple control servers 1120 (e.g., 1120(1), 1120(2), etc.) can be implemented to track and manage files.

In various embodiments, the cloud services 1130 can include an online storage service (e.g., Amazon® Simple Storage Service, Google® Cloud Storage, etc.) in which a catalog of files, including thousands or millions of files, is stored and accessed in order to fill the content servers 1110. The cloud services 1130 also can provide compute or other processing services. Although only a single instance of the cloud services 1130 is shown in FIG. 1, in various embodiments, multiple cloud services 1130 and/or cloud service instances can be implemented.

Figure 12:
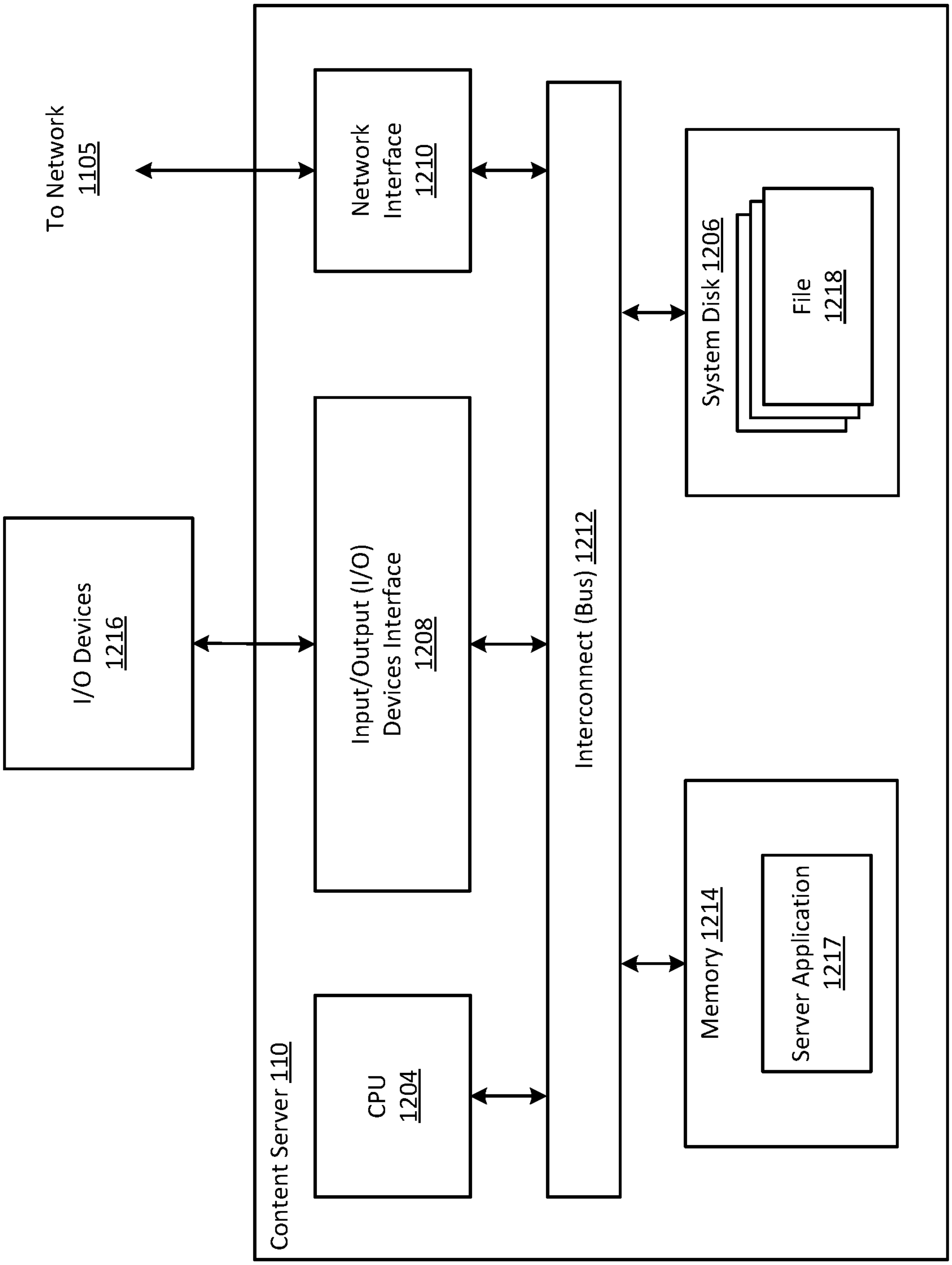
FIG. 12 is a more detailed illustration of the content server of FIG. 1, according to various embodiments of the present disclosure.

FIG. 12 is a more detailed illustration of the content server 1110 of FIG. 11, according to various embodiments of the present disclosure. As shown, the content server 1110 includes, without limitation, a central processing unit (CPU) 1204, a system disk 1206, an input/output (I/O) devices interface 1208, a network interface 1210, an interconnect 1212, and a system memory 1214.

The CPU 1204 is configured to retrieve and execute programming instructions, such as a server application 1217, stored in the system memory 1214. Similarly, the CPU 1204 is configured to store application data (e.g., software libraries) and retrieve application data from the system memory 1214. The interconnect 1212 is configured to facilitate transmission of data, such as programming instructions and application data, between the CPU 1204, the system disk 1206, the I/O devices interface 1208, the network interface 1210, and the system memory 1214. The I/O devices interface 1208 is configured to receive input data from the I/O devices 1216 and transmit the input data to the CPU 1204 via the interconnect 1212. For example, the I/O devices 1216 can include one or more buttons, a keyboard, a mouse, and/or other input devices. The I/O devices interface 1208 is further configured to receive output data from the CPU 1204 via the interconnect 1212 and transmit the output data to the I/O devices 1216.

The system disk 1206 can include one or more hard disk drives, solid state storage devices, or similar storage devices. The system disk 1206 is configured to store non-volatile data such as files 1218 (e.g., audio files, video files, subtitle files, application files, software libraries, etc.). The files 1218 can then be retrieved by the one or more endpoint devices 1115 via the network 1105. In some embodiments, the network interface 1210 is configured to operate in compliance with the Ethernet standard.

The system memory 1214 includes a server application 1217, which is configured to service requests received from the endpoint device 1115 and other content servers 1110 for the one or more files 1218. When the server application 1217 receives a request for a given file 1218, the server application 1217 retrieves the requested file 1218 from the system disk 1206 and transmits the file 1218 to an endpoint device 1115 or a content server 1110 via the network 1105. The files 1218 include digital content items such as video files, audio files, and/or still images. In addition, the files 1218 can include metadata associated with such content items, user/subscriber data, etc. The files 1218 that include visual content item metadata and/or user/subscriber data can be employed to facilitate the overall functionality of network infrastructure 1100. In alternative embodiments, some or all of the files 1218 can instead be stored in a control server 1120, or in any other technically-feasible location within the network infrastructure 1100.

Figure 13:
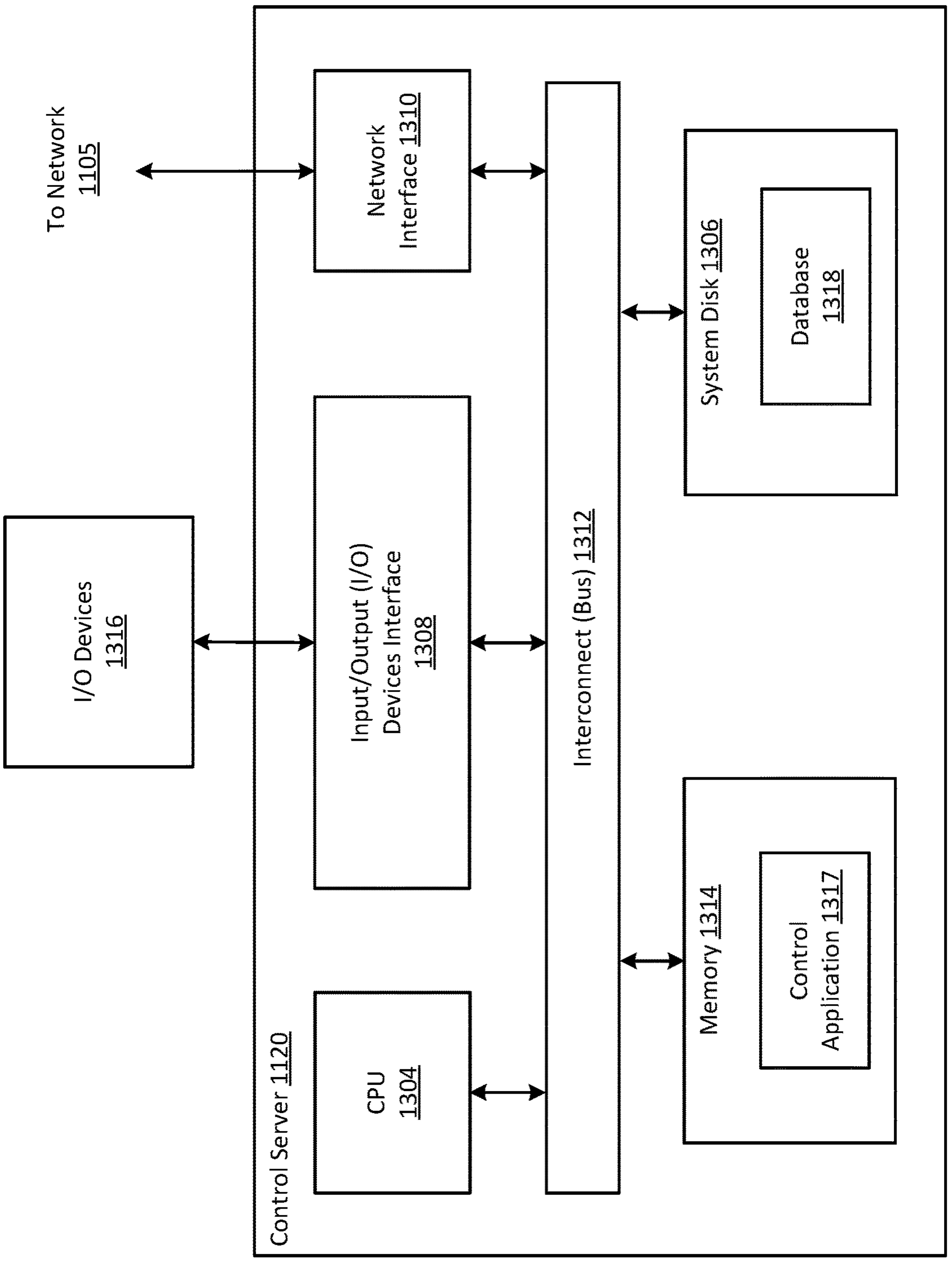
FIG. 13 is a more detailed illustration of the control server of FIG. 1, according to various embodiments of the present disclosure.

FIG. 13 is a more detailed illustration of the control server of FIG. 11, according to various embodiments of the present disclosure. As shown, the control server 1120 includes, without limitation, a central processing unit (CPU) 1304, a system disk 1306, an input/output (I/O) devices interface 1308, a network interface 1310, an interconnect 1312, and a system memory 1314.

The CPU 1304 is configured to retrieve and execute programming instructions, such as a control application 1317, stored in the system memory 1314. Similarly, the CPU 1304 is configured to store application data (e.g., software libraries) and retrieve application data from the system memory 1314 and a database 1318 stored in the system disk 1306. The interconnect 1312 is configured to facilitate transmission of data between the CPU 1304, the system disk 1306, the I/O devices interface 1308, the network interface 1310, and the system memory 1314. The I/O devices interface 1308 is configured to transmit input data and output data between the I/O devices 1316 and the CPU 1304 via the interconnect 1312.

The system disk 1306 can include one or more hard disk drives, solid state storage devices, and the like. The system disk 1306 is configured to store a database 1318 of information associated with the content servers 1110, the cloud services 1130, and the files 1218.

The system memory 1314 includes a control application 1317 configured to access information stored in the database 1318 and process the information to determine the manner in which specific files 1218 will be replicated across the content servers 110 included in the network infrastructure 1100. The control application 1317 can further be configured to receive and analyze performance characteristics associated with one or more of the content servers 1110 and/or the endpoint devices 1115. As noted above, in some embodiments, metadata associated with such visual content items, and/or user/subscriber data can be stored in the database 1318 rather than in the files 1218 stored in the content servers 1110.

Figure 14:
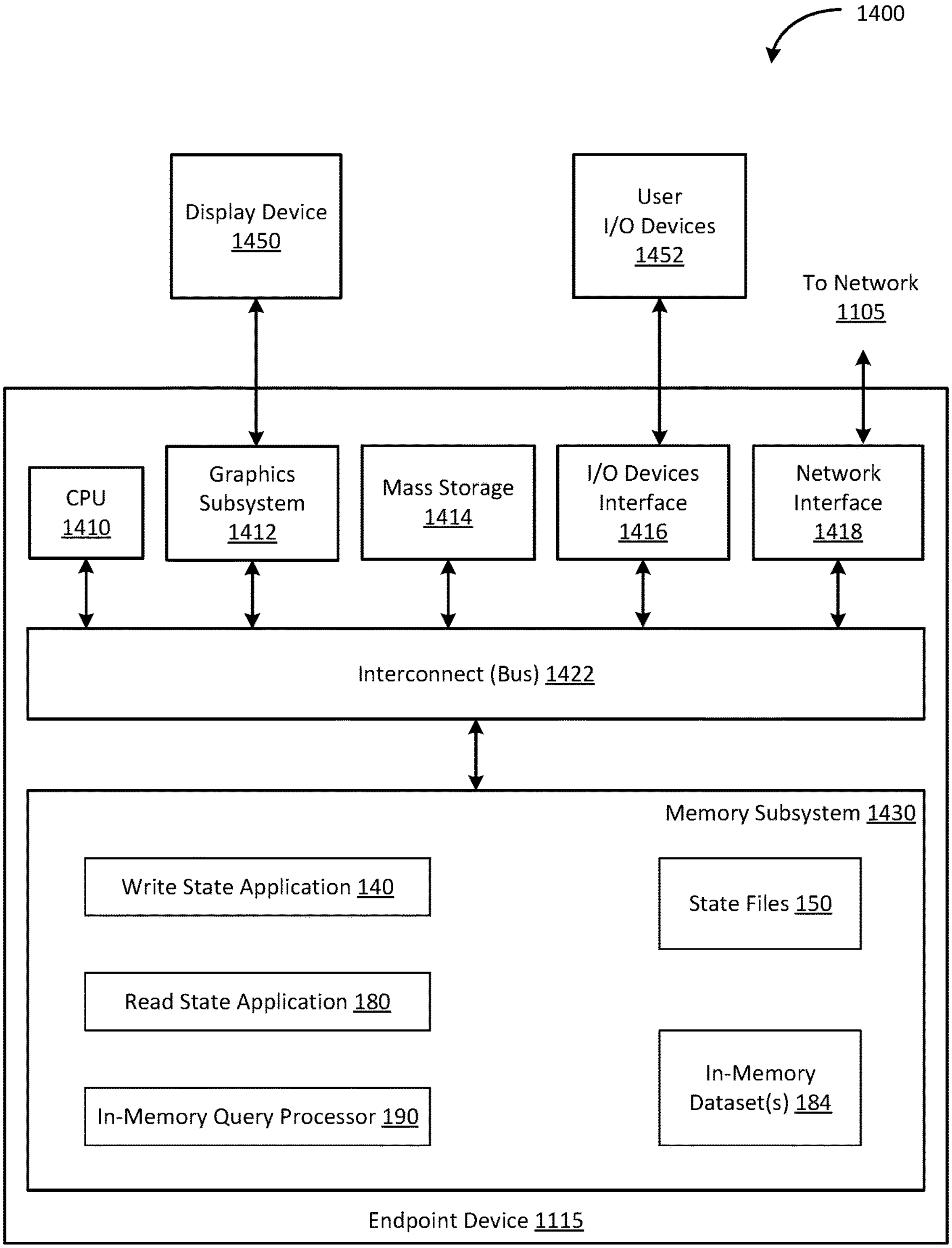
FIG. 14 is a more detailed illustration of the endpoint device of FIG. 1, according to various embodiments of the present disclosure.

FIG. 14 is a more detailed illustration 1400 of the endpoint device 1115 of FIG. 11, according to various embodiments of the present disclosure. As shown, endpoint device 1115 can include, without limitation, a CPU 1410, a graphics subsystem 1412, an I/O devices interface 1416, a mass storage unit 1414, a network interface 1418, an interconnect 1422, and a memory subsystem 1430.

In some embodiments, the CPU 1410 is configured to retrieve and execute programming instructions stored in the memory subsystem 1430. Similarly, the CPU 1410 is configured to store and retrieve application data (e.g., software libraries) residing in the memory subsystem 1430. The interconnect 1422 is configured to facilitate transmission of data, such as programming instructions and application data, between the CPU 1410, the graphics subsystem 1412, the I/O devices interface 1416, the mass storage unit 1414, the network interface 1418, and the memory subsystem 1430.

In some embodiments, the graphics subsystem 1412 is configured to generate frames of video data and transmit the frames of video data to display device 1450. In some embodiments, the graphics subsystem 1412 can be integrated into an integrated circuit, along with the CPU 1410. The display device 1450 can comprise any technically-feasible means for generating an image for display. For example, the display device 1450 can be fabricated using liquid crystal display (LCD) technology, cathode-ray technology, and light-emitting diode (LED) display technology. The I/O devices interface 1416 is configured to receive input data from the user I/O devices 1452 and transmit the input data to the CPU 1410 via the interconnect 1422. For example, the user I/O devices 1452 can include one or more buttons, a keyboard, and/or a mouse or other pointing device. The I/O devices interface 1416 also includes an audio output unit configured to generate an electrical audio output signal. The user I/O devices 1452 includes a speaker configured to generate an acoustic output in response to the electrical audio output signal. In alternative embodiments, the display device 1450 can include the speaker. Examples of suitable devices known in the art that can display video frames and generate an acoustic output include televisions, smartphones, smartwatches, electronic tablets, and the like.

A mass storage unit 1414, such as a hard disk drive or flash memory storage drive, is configured to store non-volatile data. The network interface 1418 is configured to transmit and receive packets of data via the network 1105. In some embodiments, the network interface 1418 can be configured to communicate using the well-known Ethernet standard. The network interface 1418 is coupled to CPU 1410 via interconnect 1422.

In some embodiments, the memory subsystem 1430 includes programming instructions and application data that include the write state application 140, the read state application 180, the in-memory query processor 190, the state files 150, and the in-memory datasets 184.

In sum, a consumer device in a dataset dissemination system receives one or more snapshots published by a producer device. Each snapshot represents source datasets that were compressed with a schema defined by a data model. A read state application operating on the consumer device loads one or more snapshots into memory as one or more in-memory datasets. Each in-memory dataset includes compressed, fixed-length bit-aligned representations of source data values in the source dataset. An in-memory query processor operating on the consumer device receives structured queries associated with data values in the source datasets and represented by the in-memory datasets. The in-memory query processor parses a given structured query to identify one or more applicable in-memory datasets that are to be scanned or searched. In some embodiments, the structured query identifies the applicable in-memory datasets as two or more in-memory datasets representing two or more separate source datasets. Additionally or alternatively, in some embodiments, the structured query identifies the applicable in-memory datasets as different versions of a given source dataset. The in-memory query processor causes the applicable in-memory datasets to be loaded.

The in-memory query processor executes one or more operators specified in the structured query to aggregate, filter, and/or deduplicate records included in the in-memory datasets. In some embodiments, at least one of the in-memory datasets includes a hierarchical set of tables, where processing of a single record requires processing contents of records in multiple levels of tables. In such instances, the in-memory query processor identifies each table level as a readstate and determines whether a given record in a readstate is responsive by traversing through successive levels of readstates. The in-memory query processor maintains bitsets of responsive and unresponsive intermediate results corresponding to the determined results by storing the bitsets in Boolean indices at each readstate level. A bitset includes an ordinal for uniquely identifying a record and a Boolean value indicating whether the record is responsive or unresponsive to the query. As the in-memory query processor continues to process subsequent records that refer to one of the ordinals already included in the one of indices, the in-memory query processor determines a result for the subsequent record based on the identifying the result in either the true index or the false index in lieu of further processing the records stored in successive readstate levels. Upon processing the structured query, the in-memory query processor provides a set of results that are responsive to the structured query via the consumer device.

At least one technical advantage of the disclosed technique relative to the prior art is that the in-memory dataset uses fewer memory resources than a corresponding source dataset. Consequently, the consumer device can access and search the contents of one or more datasets more efficiently and with greater precision than conventional systems. In particular, by using an in-memory query processor to build and subsequently process structured queries for the in-memory datasets, a consumer device can efficiently search multiple in-memory datasets, including multiple source datasets and multiple versions of a source dataset, without requiring major modifications to the source dataset. Further, by building indices of intermediate results to a structured query while scanning the records of an in-memory dataset, the in-memory query processor enables memoization of records included in large datasets, eliminating the query processor continually traversing through multiple levels of hierarchical tables when processing a given record. Such memoization thereby reduces the processing resources required to generate a response to a structured query. These technical advantages provide one or more technological improvements over prior art approaches.

1. In various embodiments, a computer-implemented method comprises receiving a structured query identifying a plurality of source datasets, determining, based on a plurality of schemas associated with the plurality of source datasets, the plurality of source datasets associated with the structured query, loading a plurality of in-memory datasets, each in-memory dataset representing a source dataset in the plurality of source datasets, and executing the structured query on each of the plurality of in-memory datasets by causing portions of the structured query to be applied to each of the plurality of in-memory datasets to generate a query result.

2. The computer-implemented method of clause 1, further comprising retrieving a first schema in the plurality of schemas, where the first schema is associated with a first type of records included in the in-memory dataset, where the first schema defines a structure for a plurality of fields for a data type, and metadata associated with one or more fields in the plurality of fields.

3. The computer-implemented method of clause 1 or 2, further comprising providing a graphical user interface listing at least one of the plurality of fields specified by the first schema, where receiving the structured query comprise receiving an input that includes the at least one of the plurality of fields, and generating, based on the input, a query including the at least one of the plurality of fields.

4. The computer-implemented method of any of clauses 1, where the structured query includes a field defined by a first schema in the plurality of schemas.

5. The computer-implemented method of any of clauses 1-4, where loading the plurality of source datasets into memory comprises copying a first snapshot associated with a first source dataset into the memory to generate a first in-memory dataset comprising compressed representations of the first source dataset, and copying a second snapshot associated with a second source dataset into the memory to generate a second in-memory dataset comprising compressed representations of the second source dataset.

6. The computer-implemented method of claim any of clauses 1-5, further comprising copying a first delta file to the memory, and applying the first delta file to the first in-memory dataset to generate a third in-memory dataset, where the first in-memory dataset is associated with a first version of the first source dataset and the third in-memory dataset is associated with a second version of the first source dataset.

7. The computer-implemented method of any of clauses 1-6, where executing the structured query on each of the plurality of in-memory datasets comprises identifying an aggregating operator in the structured query, where the aggregating operator comprises an operator from a group consisting of a sum operator, a count operator, an average operator, a minimum operator, and a maximum operator, identifying at least two in-memory datasets in the plurality of in-memory datasets that are associated with the aggregating operator, and performing an aggregating operation corresponding to the aggregating operator on the plurality of in-memory datasets.

8. The computer-implemented method of claim 1, further comprising identifying, based on the structured query, a plurality of tables included in a first in-memory dataset in the plurality of in-memory datasets, generating, for each table in the plurality of tables, a first index of records included in the table that is associated with at least one field value responsive to the structured query, and a second index of records included in the table that is not associated with at least one field value responsive to the structured query, where the first index and second index are usable to respond to subsequent queries.

9. In various embodiments, one or more non-transitory computer-readable media store instructions that, when executed by one or more processors, cause the one or more processors to perform the steps of receiving a structured query identifying a source dataset, determining that the structured query is associated with at least two versions of the source dataset, loading each of the at least two versions of the source dataset to memory as a first in-memory dataset and a second in-memory dataset in a plurality of in-memory datasets, and executing the structured query on at least the first in-memory dataset and the second in-memory dataset.

10. The one or more non-transitory computer-readable media of clause 9, where loading each of the at least two versions of the source dataset to memory comprises copying a first snapshot associated with a first source dataset into the memory to generate the first in-memory dataset comprising compressed representations of the first source dataset, copying a first delta file to the memory, and applying the first delta file to the first in-memory dataset to generate the second in-memory dataset.

11. The one or more non-transitory computer-readable media of clause 9 or 10, where executing the structured query on two or more of the plurality of in-memory datasets comprises identifying, in the structured query, a distinguishing operator, identifying the first in-memory dataset and the second in-memory dataset as associated with the distinguishing operator, the distinguishing operator deduplicating one or more records that are present in both the first in-memory dataset and the second in-memory dataset, and performing a deduplication operation corresponding to the distinguishing operator on the first in-memory dataset and the second in-memory dataset.

12. The one or more non-transitory computer-readable media of any of clauses 9-11, further comprising instructions that, when executed by the one or more processors, cause the one or more processors to perform the step of for each in-memory dataset in the plurality of in-memory datasets, retrieving a set of one or more schemas associated with a first type of records included in the in-memory dataset, where each schema in the set of one or more schemas defines a structure for a plurality of fields for a data type, and metadata associated with one or more fields in the plurality of fields.

13. The one or more non-transitory computer-readable media of any of clauses 9-12, further comprising instructions that, when executed by the one or more processors, cause the one or more processors to perform the step of providing a graphical user interface listing at least one of the plurality of fields specified by the set of one or more schemas, where receiving the structured query comprises receiving an input that includes the at least a field in the plurality of fields, and generating, based on the input, a query including the at least one of the plurality of fields.

14. The one or more non-transitory computer-readable media of any of clauses 9-13, further comprising instructions that, when executed by the one or more processors, cause the one or more processors to perform the step of identifying, based on the structured query, a plurality of tables included in the first in-memory dataset in the plurality of in-memory datasets, generating, for each table in the plurality of tables, a first index of records included in the table that is associated with at least one field value responsive to the structured query, and a second index of records included in the table that is not associated with at least one field value responsive to the structured query, where the first index and second index are usable to respond to subsequent queries.

15. In various embodiments, a computer-implemented method comprises receiving a structured query identifying a source dataset, determining that the structured query is associated with at least two versions of the source dataset, loading each of the at least two versions of the source dataset to memory as a first in-memory dataset and a second in-memory dataset in a plurality of in-memory datasets, and executing the structured query on at least the first in-memory dataset and the second in-memory dataset.

16. The computer-implemented method of clause 15, where loading each of the at least two versions of the source dataset to memory comprises copying a first snapshot associated with a first source dataset into the memory to generate the first in-memory dataset comprising compressed representations of the first source dataset, copying a first delta file to the memory, and applying the first delta file to the first in-memory dataset to generate the second in-memory dataset.

17. The computer-implemented method of clause 15 or 16, where executing the structured query on two or more of the plurality of in-memory datasets comprises identifying, in the structured query, a distinguishing operator, identifying the first in-memory dataset and the second in-memory dataset as associated with the distinguishing operator, the distinguishing operator deduplicating one or more records that are present in both the first in-memory dataset and the second in-memory dataset, and performing a deduplication operation corresponding to the distinguishing operator on the first in-memory dataset and the second in-memory dataset.

18. The computer-implemented method of any of clauses 15-17, further comprising for each in-memory dataset in the plurality of in-memory datasets, retrieving a set of one or more schemas associated with a first type of records included in the in-memory dataset, where each schema in the set of one or more schemas defines a structure for a plurality of fields for a data type, and metadata associated with one or more fields in the plurality of fields.

19. The computer-implemented method of any of clauses 15-18, further comprising providing a graphical user interface listing at least one of the plurality of fields specified by the set of one or more schemas, where receiving the structured query comprises receiving an input that includes the at least a field in the plurality of fields, and generating, based on the input, a query including the at least one of the plurality of fields.

20. The computer-implemented method of any of clauses 15-19, further comprising identifying, based on the structured query, a plurality of tables included in the first in-memory dataset in the plurality of in-memory datasets, generating, for each table in the plurality of tables, a first index of records included in the table that is associated with at least one field value responsive to the structured query, and a second index of records included in the table that is not associated with at least one field value responsive to the structured query, where the first index and second index are usable to respond to subsequent queries.

21. In various embodiments, a computer-implemented method comprises receiving a structured query for an in-memory dataset, identifying, based on the structured query, a plurality of tables included in the in-memory dataset, generating, for each table in the plurality of tables, a first index of records in the table that is associated with at least one field value responsive to the structured query, and a second index of records in the table that is not associated with at least one field value responsive to the structured query, and executing the structured query by processing indices in one or more of the tables to identify a list of records containing field values that are responsive to the structured query.

22. The computer-implemented method of clause 21, where the first index and second index are generated in real time while executing the structured query.

23. The computer-implemented method of clause 21 or 22, where the first index of records comprises a list of ordinal values, each ordinal value uniquely identifying a record in the table.

24. The computer-implemented method of any of clauses 21-24, where one or more records in a first table in the plurality of tables references one or more records in a second table in the plurality of tables.

25. The computer-implemented method of any of clauses 21-24, where executing the structured query comprises processing a first record in a first table in the plurality of tables, determining that the first index does not reference any additional records, and generating a result based on contents included in the first record.

26. The computer-implemented method of any of clauses 21-25, where executing the structured query comprises processing a record in a table in the plurality of tables, determining that the record references at least one additional record in the plurality of tables, and traversing to a first additional record included in the plurality of tables.

27. The computer-implemented method of any of clauses 21-26, further comprising upon executing the structured query, for each table in the plurality of tables, deleting the first index and the second index.

28. The computer-implemented method of any of clauses 21-27, further comprising after executing the structured query, storing the structured query as a stored query, receiving a command to execute the stored query, retrieving the indices for each table in the plurality of tables, executing the stored query by processing the indices in one or more of the tables to identify a second list of records containing field values that are responsive to the stored query.

29. The computer-implemented method of any of clauses 21-28, further comprising retrieving a set of one or more schemas associated with a first type of records included in the in-memory dataset, where each schema in the set of one or more schemas defines a structure for a plurality of fields for a data type, and metadata associated with one or more fields in the plurality of fields.

30. The computer-implemented method of any of clauses 21-29, further comprising copying a first snapshot associated with a first source dataset into the memory to generate the in-memory dataset, where the in-memory dataset comprises compressed representations of the first source dataset.

31. In various embodiments, one or more non-transitory computer-readable media storing instructions that, when executed by one or more processors, cause the one or more processors to perform the steps of receiving a structured query for an in-memory dataset, identifying, based on the structured query, a plurality of tables included in the in-memory dataset, generating, for each table in the plurality of tables, a first index of records included in the table that is associated with at least one field value responsive to the structured query, and a second index of records included in the table that is not associated with at least one field value responsive to the structured query, and executing the structured query by processing indices in one or more of the tables to identify a list of records containing field values that are responsive to the structured query.

32. The one or more non-transitory computer-readable media of clause 31, where the first index and second index are generated in real time while executing the structured query.

33. The one or more non-transitory computer-readable media of clause 31 or 32, where one or more records in a first table in the plurality of tables references one or more records in a second table in the plurality of tables.

34. The one or more non-transitory computer-readable media of any of clauses 31-33, further comprising instructions that, when executed by one or more processors, cause the one or more processors to perform the step of upon executing the structured query, for each table in the plurality of tables, deleting the first index and the second index.

35. The one or more non-transitory computer-readable media of any of clauses 31-34, further comprising instructions that, when executed by one or more processors, cause the one or more processors to perform the step of retrieving a set of one or more schemas associated with a first type of records included in the in-memory dataset, where each schema in the set of one or more schemas defines a structure for a plurality of fields for a data type, and metadata associated with one or more fields in the plurality of fields.

36. In various embodiments, a system comprises a memory storing an in-memory query processor, and a processor coupled to the memory that executes the in-memory query processor by performing the steps of receiving a structured query for an in-memory dataset, identifying, based on the structured query, a plurality of tables included in the in-memory dataset, generating, for each table in the plurality of tables, a first index of records included in the table that is associated with at least one field value responsive to the structured query, and a second index of records included in the table that is not associated with at least one field value responsive to the structured query, and executing the structured query by processing indices in one or more of the tables to identify a list of records containing field values that are responsive to the structured query.

37. The system of clause 36, where the first index and second index are generated in real time while executing the structured query.

38. The system of clause 36 or 37, where one or more records in a first table in the plurality of tables references one or more records in a second table in the plurality of tables.

39. The system of any of clauses 36-38, where the processor further executes the in-memory query processor by performing the step of upon executing the structured query, for each table in the plurality of tables, deleting the first index and the second index.

40. The system of any of clauses 36-39, where the processor further executes the in-memory query processor by performing the step of retrieving a set of one or more schemas associated with a first type of records included in the in-memory dataset, where each schema in the set of one or more schemas defines a structure for, a plurality of fields for a data type, and metadata associated with one or more fields in the plurality of fields.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function (s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method comprising:

receiving a structured query identifying a plurality of source datasets;

retrieving a plurality of schemas from one or more data models associated with the plurality of source datasets, wherein each schema included in the plurality of schemas defines a structure of a record included in a source dataset of the plurality of source datasets;

validating, based on the plurality of schemas, one or more parameters of the structured query;

upon validating the structured query, loading, into volatile memory, a plurality of in-memory datasets, wherein each in-memory dataset corresponds to an entirety of a source dataset in the plurality of source datasets; and executing the structured query on each in-memory dataset of the plurality of in-memory datasets by causing portions of the structured query to be applied to each in-memory dataset of the plurality of in-memory datasets to generate a query result that includes one or more records included in the plurality of in-memory datasets.

2. The computer-implemented method of claim 1, further comprising:

retrieving a first schema in the plurality of schemas, wherein the first schema is associated with a first type of records included at least one in-memory dataset included in the plurality of in-memory datasets, wherein the first schema defines a structure for:

a plurality of fields for a data type, and metadata associated with one or more fields in the plurality of fields.

3. The computer-implemented method of claim 2, further comprising:

providing a graphical user interface listing at least one of the plurality of fields specified by the first schema, wherein receiving the structured query comprises:

receiving an input that includes the at least one of the plurality of fields, and generating, based on the input, a query including the at least one of the plurality of fields.

4. The computer-implemented method of claim 1, identifying, in the structured query, a first field defined by a first schema in the plurality of schemas, wherein a first source dataset of the plurality of source datasets includes the first field.

5. The computer-implemented method of claim 1, wherein loading the plurality of source datasets into memory comprises:

copying a first snapshot associated with a first source dataset into the memory to generate a first in-memory dataset comprising compressed representations of the first source dataset, and copying a second snapshot associated with a second source dataset into the memory to generate a second in-memory dataset comprising compressed representations of the second source dataset.

6. The computer-implemented method of claim 5, further comprising:

copying a first delta file to the memory; and applying the first delta file to the first in-memory dataset to generate a third in-memory dataset, wherein the first in-memory dataset is associated with a first version of the first source dataset and the third in-memory dataset is associated with a second version of the first source dataset.

7. The computer-implemented method of claim 1, wherein executing the structured query on each in-memory dataset of the plurality of in-memory datasets comprises:

identifying an aggregating operator in the structured query, wherein the aggregating operator comprises an operator from a group consisting of: a count operator, a minimum operator, and a maximum operator;

identifying at least two in-memory datasets in the plurality of in-memory datasets that are associated with the aggregating operator, and performing an aggregating operation corresponding to the aggregating operator on the plurality of in-memory datasets.

8. The computer-implemented method of claim 1, further comprising:

identifying, based on the structured query, a plurality of tables included in a first in-memory dataset in the plurality of in-memory datasets;

generating, for each table in the plurality of tables:

a first index of records that is in the table and is associated with at least one field value responsive to the structured query, and a second index of records that is in the table and is not associated with at least one field value responsive to the structured query, wherein the first index and second index are usable to respond to subsequent queries.

9. One or more non-transitory computer-readable media storing instructions that, when executed by one or more processors, cause the one or more processors to perform the steps of:

receiving a structured query identifying a first source dataset;

retrieving a plurality of schemas from one or more data models associated with a plurality of source datasets that includes the first source dataset, wherein each schema included in the plurality of schemas defines a structure of a record included in a source dataset of the plurality of source datasets;

validating, based on the plurality of schemas, one or more parameters of the structured query;

determining that the structured query is associated with at least two versions of the first source dataset;

upon validating the structure query, loading, into volatile memory, each of the at least two versions of the first source dataset to memory as a first in-memory dataset and a second in-memory dataset in a plurality of in-memory datasets, wherein each in-memory dataset corresponds to an entirety of a version of the first source dataset in the plurality of source datasets; and executing the structured query on at least the first in-memory dataset and the second in-memory dataset to generate a query result that includes one or more records included in the plurality of in-memory datasets.

10. The one or more non-transitory computer-readable media of claim 9, wherein loading each of the at least two versions of the first source dataset to memory comprises:

copying a first snapshot associated with the first source dataset into the memory to generate the first in-memory dataset comprising compressed representations of the first source dataset, copying a first delta file to the memory; and applying the first delta file to the first in-memory dataset to generate the second in-memory dataset.

11. The one or more non-transitory computer-readable media of claim 10, wherein executing the structured query on two or more in-memory datasets of the plurality of in-memory datasets comprises:

identifying, in the structured query, a distinguishing operator;

identifying the first in-memory dataset and the second in-memory dataset as associated with the distinguishing operator, the distinguishing operator deduplicating one or more records that are present in both the first in-memory dataset and the second in-memory dataset, and performing a deduplication operation corresponding to the distinguishing operator on the first in-memory dataset and the second in-memory dataset.

12. The one or more non-transitory computer-readable media of claim 9, further comprising instructions that, when executed by the one or more processors, cause the one or more processors to perform the step of:

for each in-memory dataset in the plurality of in-memory datasets, retrieving a set of one or more schemas associated with a first type of records included in the in-memory dataset, wherein each schema in the set of one or more schemas defines a structure for:

a plurality of fields for a data type, and metadata associated with one or more fields in the plurality of fields.

13. The one or more non-transitory computer-readable media of claim 12, further comprising instructions that, when executed by the one or more processors, cause the one or more processors to perform the step of:

providing a graphical user interface listing at least one of the plurality of fields specified by the set of one or more schemas, wherein receiving the structured query comprises:

receiving an input that includes the at least one of the plurality of fields, and generating, based on the input, a query including the at least one of the plurality of fields.

14. The one or more non-transitory computer-readable media of claim 12, further comprising instructions that, when executed by the one or more processors, cause the one or more processors to perform the step of:

identifying, based on the structured query, a plurality of tables included in the first in-memory dataset in the plurality of in-memory datasets;

generating, for each table in the plurality of tables:

a first index of records that is in the table and is associated with at least one field value responsive to the structured query, and a second index of records that is in the table and is not associated with at least one field value responsive to the structured query, wherein the first index and second index are usable to respond to subsequent queries.

15. A computer-implemented method comprising:

receiving a structured query identifying a first source dataset;

retrieving a plurality of schemas from one or more data models associated with a plurality of source datasets that includes the first source dataset, wherein each schema included in the plurality of schemas defines a structure of a record included in a source dataset of the plurality of source datasets;

validating, based on the plurality of schemas, one or more parameters of the structured query;

determining that the structured query is associated with at least two versions of the first source dataset;

upon validating the structured query, loading, into volatile memory, each of the at least two versions of the first source dataset as a first in-memory dataset and a second in-memory dataset in a plurality of in-memory datasets, wherein each in-memory dataset corresponds to an entirety of a version of the first source dataset in the plurality of source datasets; and executing the structured query on at least the first in-memory dataset and the second in-memory dataset to generate a query result that includes one or more records included in the plurality of in-memory datasets.

16. The computer-implemented method of claim 15, wherein loading each of the at least two versions of the first source dataset to memory comprises:

copying a first snapshot associated with the first source dataset into the memory to generate the first in-memory dataset comprising compressed representations of the first source dataset, copying a first delta file to the memory; and applying the first delta file to the first in-memory dataset to generate the second in-memory dataset.

17. The computer-implemented method of claim 16, wherein executing the structured query on two or more in-memory datasets of the plurality of in-memory datasets comprises:

identifying, in the structured query, a distinguishing operator;

identifying the first in-memory dataset and the second in-memory dataset as associated with the distinguishing operator, the distinguishing operator deduplicating one or more records that are present in both the first in-memory dataset and the second in-memory dataset, and performing a deduplication operation corresponding to the distinguishing operator on the first in-memory dataset and the second in-memory dataset.

18. The computer-implemented method of claim 15, further comprising:

for each in-memory dataset in the plurality of in-memory datasets, retrieving a set of one or more schemas associated with a first type of records included in the in-memory dataset, wherein each schema in the set of one or more schemas defines a structure for:

a plurality of fields for a data type, and metadata associated with one or more fields in the plurality of fields.

19. The computer-implemented method of claim 18, further comprising:

providing a graphical user interface listing at least one of the plurality of fields specified by the set of one or more schemas, wherein receiving the structured query comprises:

receiving an input that includes the at least a field in the plurality of fields, and generating, based on the input, a query including the at least one of the plurality of fields.

20. The computer-implemented method of claim 15, further comprising:

identifying, based on the structured query, a plurality of tables included in the first in-memory dataset in the plurality of in-memory datasets;

generating, for each table in the plurality of tables:

a first index of records that is in the table and is associated with at least one field value responsive to the structured query, and a second index of records that is in the table and is not associated with at least one field value responsive to the structured query, wherein the first index and second index are usable to respond to subsequent queries.

* * * * *